US 9,221,032 B2

(12) United States Patent
Reed et al.

(10) Patent No.: US 9,221,032 B2
(45) Date of Patent: Dec. 29, 2015

(54) PROCESS FOR MAKING CERIUM DIOXIDE NANOPARTICLES

(71) Applicants: Kenneth Reed, Rochester, NY (US); Albert Gary DiFrancesco, Rochester, NY (US)

(72) Inventors: Kenneth Reed, Rochester, NY (US); Albert Gary DiFrancesco, Rochester, NY (US)

(73) Assignee: CERION, LLC, Rochester, NY (US)

( * ) Notice: Subject to any disclaimer, the term of this patent is extended or adjusted under 35 U.S.C. 154(b) by 0 days.

(21) Appl. No.: 13/865,858

(22) Filed: Apr. 18, 2013

(65) Prior Publication Data

US 2013/0230444 A1 Sep. 5, 2013

Related U.S. Application Data

(63) Continuation of application No. 13/444,129, filed on Apr. 11, 2012, now abandoned, which is a continuation (Continued)

(51) Int. Cl.
*B01J 23/10* (2006.01)
*B01F 3/08* (2006.01)
(Continued)

(52) U.S. Cl.
CPC ............ *B01J 23/10* (2013.01); *B01F 3/0807* (2013.01); *B01F 7/164* (2013.01); *B01J 13/0047* (2013.01);
(Continued)

(58) Field of Classification Search
CPC ............ C10M 2201/062; C10N 2210/03; C10N 2220/082; C10N 2230/06; C10N 2240/10; B01F 7/164; B01F 3/0807; B01J 13/0047; B01J 13/0086; B01J 23/10; B82Y 30/00; C10L 10/02; C10L 10/08; C10L 10/12; C10L 1/10; C10L 1/103; C10L 1/1233; C10L 1/125; C10L 1/1258; C10L 1/1608;
C10L 1/1616; C10L 1/1811; C10L 1/1824; C10L 1/1881; C10L 1/1883; C10L 1/19; C10L 1/1985; C10L 1/2222; C10L 1/2437; Y02T 50/678
USPC ............................................. 44/301; 432/263
See application file for complete search history.

(56) References Cited

U.S. PATENT DOCUMENTS 1,592,713 A 7/1926 Bendixen
2,965,678 A 12/1960 Sundberg
(Continued)

FOREIGN PATENT DOCUMENTS

CA 1201128 A1 2/1986
CA 2 536 276 3/2005
(Continued)

OTHER PUBLICATIONS

Australian Office Action of Corresponding Australian Patent Application No. 2008365234, Issued July 10, 2014.
(Continued)

*Primary Examiner* — James Goloboy
*Assistant Examiner* — Latosha Hines
(74) *Attorney, Agent, or Firm* — RatnerPrestia

(57) ABSTRACT

A method of improving the efficiency of a diesel engine provided with a source of diesel fuel includes the steps of: a) adding to the diesel fuel a reverse-micellar composition having an aqueous first disperse phase that includes a free radical initiator and a first continuous phase that includes a first hydrocarbon liquid, a first surfactant, and optionally a co-surfactant, thereby producing a modified diesel fuel, and b) operating the engine, thereby combusting the modified diesel fuel. The efficiency of a diesel engine provided with a source of diesel fuel and a source of lubricating oil can also be improved by modifying the lubricating oil by the addition of a stabilized nanoparticulate composition of cerium dioxide. The efficiency of a diesel engine can also be improved by adding to the diesel fuel a reverse-micellar composition that includes an aqueous disperse phase containing boric acid or a borate salt.

9 Claims, 7 Drawing Sheets

Related U.S. Application Data of application No. 12/440,171, filed as application No. PCT/US2007/077543 on Sep. 4, 2007, now abandoned.

(60) Provisional application No. 60/824,514, filed on Sep. 5, 2006, provisional application No. 60/911,159, filed on Apr. 11, 2007, provisional application No. 60/938,314, filed on May 16, 2007.

(51) Int. Cl.
    *B01F 7/16* (2006.01)
    *B01J 13/00* (2006.01)
    *C10L 1/10* (2006.01)
    *C10L 10/02* (2006.01)
    *C10L 10/08* (2006.01)
    *C10L 10/12* (2006.01)
    *B82Y 30/00* (2011.01)
    *C10L 1/12* (2006.01)
    *C10L 1/16* (2006.01)
    *C10L 1/18* (2006.01)
    *C10L 1/182* (2006.01)
    *C10L 1/188* (2006.01)
    *C10L 1/19* (2006.01)
    *C10L 1/198* (2006.01)
    *C10L 1/222* (2006.01)
    *C10L 1/24* (2006.01)

(52) U.S. Cl.
    CPC .............. *B01J 13/0086* (2013.01); *C10L 1/10* (2013.01); *C10L 1/103* (2013.01); *C10L 10/02* (2013.01); *C10L 10/08* (2013.01); *C10L 10/12* (2013.01); *B82Y 30/00* (2013.01); *C10L 1/125* (2013.01); *C10L 1/1233* (2013.01); *C10L 1/1258* (2013.01); *C10L 1/1608* (2013.01); *C10L 1/1616* (2013.01); *C10L 1/1811* (2013.01); *C10L 1/1824* (2013.01); *C10L 1/1881* (2013.01); *C10L 1/1883* (2013.01); *C10L 1/19* (2013.01); *C10L 1/1985* (2013.01); *C10L 1/2222* (2013.01); *C10L 1/2437* (2013.01); *C10M 2201/062* (2013.01); *C10N 2230/06* (2013.01); *C10N 2240/10* (2013.01); *Y02T 50/678* (2013.01)

(56) References Cited

U.S. PATENT DOCUMENTS

| | | | |
|---|---|---|---|
| 2,965,994 A | 12/1960 | Sullivan | |
| 3,002,826 A | 10/1961 | Norris | |
| 3,951,934 A | 4/1976 | Ohshima | |
| 3,964,994 A | 6/1976 | Kelly | |
| 4,061,473 A | 12/1977 | Norris | |
| 4,231,893 A | 11/1980 | Woodhead | |
| 4,294,586 A | 10/1981 | Cox | |
| 4,359,969 A | 11/1982 | Mellovist | |
| 4,389,220 A | 6/1983 | Kracklauer | |
| 4,545,923 A | 10/1985 | Gradeff | |
| 4,599,201 A | 7/1986 | Gradeff | |
| 4,661,321 A | 4/1987 | Byrd | |
| 4,744,796 A | 5/1988 | Hazbun | |
| 4,774,796 A | 10/1988 | Aiuola | |
| 4,786,325 A | 11/1988 | Melard | |
| 5,004,478 A | 4/1991 | Vogel | |
| 5,017,352 A | 5/1991 | Chane-Ching | |
| 5,097,090 A | 3/1992 | Beck | |
| 5,105,772 A | 4/1992 | Olsson | |
| 5,248,744 A | 9/1993 | Cramm | |
| 5,344,588 A | 9/1994 | Chane-Ching | |
| 5,385,648 A | 1/1995 | Sugishima | |
| 5,389,352 A | 2/1995 | Wang | |
| 5,405,417 A | 4/1995 | Cunningham | |
| 5,449,387 A | 9/1995 | Hawkins | |
| 5,520,710 A | 5/1996 | Olah | |
| 5,552,133 A | 9/1996 | Lambert | |
| 5,712,218 A | 1/1998 | Chopin | |
| 5,759,917 A | 6/1998 | Grover | |
| 5,906,664 A | 5/1999 | Basu | |
| 5,910,466 A | 6/1999 | Yamashita | |
| 5,919,727 A | 7/1999 | Brezny | |
| 5,938,837 A | 8/1999 | Hanawa | |
| 6,093,223 A | 7/2000 | Lemaire | |
| 6,133,194 A | 10/2000 | Cuif | |
| 6,136,048 A | 10/2000 | Birchem | |
| 6,158,397 A | 12/2000 | Peters | |
| 6,210,451 B1 | 4/2001 | Chopin | |
| 6,271,269 B1 | 8/2001 | Chane-Ching | |
| 6,305,626 B1 | 10/2001 | Korstvedt | |
| 6,362,314 B2 * | 3/2002 | Akkara et al. | 528/488 |
| 6,368,366 B1 | 4/2002 | Langer | |
| 6,382,314 B1 | 5/2002 | Doll | |
| 6,383,237 B1 | 5/2002 | Langer | |
| 6,391,995 B2 | 5/2002 | Murugan | |
| 6,413,489 B1 | 7/2002 | Ying | |
| 6,422,736 B1 | 7/2002 | Antoniades | |
| 6,509,319 B1 | 1/2003 | Raad | |
| 6,627,720 B2 | 9/2003 | Campbell | |
| 6,634,576 B2 | 10/2003 | Verhoff | |
| 6,645,262 B1 | 11/2003 | Sanduja | |
| 6,649,156 B1 | 11/2003 | Chane-Ching | |
| 6,723,138 B2 | 4/2004 | Nickel | |
| 6,725,653 B2 | 4/2004 | Brown | |
| 6,745,961 B2 | 6/2004 | Korstvedt | |
| 6,752,979 B1 | 6/2004 | Talbot | |
| 6,869,584 B2 | 3/2005 | Ying | |
| 6,892,531 B2 | 5/2005 | Rim | |
| 6,897,270 B2 | 5/2005 | Ozawa | |
| 6,962,681 B2 | 11/2005 | Maganas | |
| 7,008,965 B2 | 3/2006 | Chane-Ching | |
| 7,025,943 B2 | 4/2006 | Zhou | |
| 7,063,729 B2 | 6/2006 | Valentine | |
| 7,169,196 B2 | 1/2007 | Wakefield | |
| 7,189,768 B2 | 3/2007 | Baran, Jr. | |
| 7,195,653 B2 | 3/2007 | Hazarika | |
| 7,232,556 B2 | 6/2007 | Yadav | |
| 7,384,888 B2 | 6/2008 | Kuno | |
| 7,419,516 B1 | 9/2008 | Seal | |
| 7,473,408 B2 * | 1/2009 | Noh et al. | 423/263 |
| 7,683,098 B2 | 3/2010 | Yadav | |
| 7,709,411 B2 | 5/2010 | Zhou et al. | |
| 7,803,201 B2 * | 9/2010 | Zhou et al. | 44/603 |
| 7,914,617 B2 | 3/2011 | Yadav | |
| 7,939,040 B2 * | 5/2011 | Larcher et al. | 423/263 |
| 8,076,846 B2 | 12/2011 | Mizuno | |
| 8,679,344 B2 | 3/2014 | Alston et al. | |
| 2002/0095859 A1 | 7/2002 | Hicks | |
| 2002/0110519 A1 | 8/2002 | Ying | |
| 2002/0177311 A1 | 11/2002 | Schumacher | |
| 2003/0148235 A1 | 8/2003 | Valentine | |
| 2003/0154646 A1 | 8/2003 | Hazarika | |
| 2003/0162843 A1 | 8/2003 | Chane-Ching | |
| 2003/0182846 A1 | 10/2003 | Nelson | |
| 2003/0182848 A1 | 10/2003 | Collier et al. | |
| 2003/0215378 A1 | 11/2003 | Zhou | |
| 2003/0221362 A1 | 12/2003 | Collier | |
| 2004/0029978 A1 | 2/2004 | Chane-Ching | |
| 2004/0035045 A1 | 2/2004 | Caprotti | |
| 2004/0137239 A1 | 7/2004 | Klos | |
| 2004/0241070 A1 | 12/2004 | Noh | |
| 2005/0005506 A1 | 1/2005 | Henly | |
| 2005/0031517 A1 | 2/2005 | Chan | |
| 2005/0044778 A1 | 3/2005 | Orr | |
| 2005/0060929 A1 | 3/2005 | Caprotti | |
| 2005/0066571 A1 | 3/2005 | Wakefield | |
| 2005/0152832 A1 | 7/2005 | Ying | |
| 2005/0165139 A1 | 7/2005 | Kawakami | |
| 2005/0227864 A1 | 10/2005 | Sutorik | |
| 2006/0000140 A1 | 1/2006 | Caprotti | |
| 2006/0005465 A1 | 1/2006 | Blanchard | |
| 2006/0027484 A1 * | 2/2006 | Leck et al. | 208/108 |

(56) References Cited

U.S. PATENT DOCUMENTS

| | | |
|---|---|---|
| 2006/0057048 A1 | 3/2006 | Chan et al. |
| 2006/0083694 A1 | 4/2006 | Kodas |
| 2006/0185644 A1 | 8/2006 | Hashimoto |
| 2006/0254130 A1 | 11/2006 | Scattergood |
| 2007/0056601 A1 | 3/2007 | Pillai |
| 2007/0224092 A1 | 9/2007 | Miyairi |
| 2008/0009410 A1 | 1/2008 | Okamoto |
| 2008/0161213 A1 | 7/2008 | Jao |
| 2009/0215614 A1 | 8/2009 | Chane-Ching |
| 2009/0298684 A1 | 12/2009 | Zhou |
| 2010/0088949 A1 | 4/2010 | Reed |
| 2010/0089949 A1 | 4/2010 | Gramann |
| 2010/0111789 A1 | 5/2010 | Fajardie |
| 2010/0135937 A1 | 6/2010 | O'Brien et al. |
| 2010/0152077 A1 | 6/2010 | Allston |
| 2010/0199547 A1 | 8/2010 | Reed |
| 2010/0242342 A1 | 9/2010 | Reed |
| 2011/0056123 A1 | 3/2011 | DiFrancesco et al. |
| 2012/0124899 A1 | 5/2012 | DiFrancesco et al. |

FOREIGN PATENT DOCUMENTS

| | | |
|---|---|---|
| CN | 101113010 | 1/2008 |
| EP | 0208580 A1 | 1/1987 |
| EP | 0475620 A2 | 3/1992 |
| EP | 1842591 A1 | 10/2007 |
| FR | 2789601 A1 | 8/2000 |
| FR | 2885308 A1 | 11/2006 |
| GB | 242020 | 11/1925 |
| GB | 360171 A | 11/1931 |
| JP | S59-001439 A | 1/1984 |
| JP | S59-045925 A | 3/1984 |
| JP | 05155616 | 6/1993 |
| JP | 07309624 | 11/1995 |
| JP | H08-509002 A | 9/1996 |
| JP | H11-501609 A | 2/1999 |
| JP | 2001504078 | 3/2001 |
| JP | 2001-507739 A | 6/2001 |
| JP | 2002-537308 A | 11/2002 |
| JP | 2002326812 | 11/2002 |
| JP | 2003-520748 A | 7/2003 |
| JP | 2004-502022 A | 1/2004 |
| JP | 2004-507343 A | 3/2004 |
| JP | 2005-508442 A | 3/2005 |
| JP | 2005139029 | 6/2005 |
| JP | 2006-040556 A | 2/2006 |
| JP | 2006-506524 A | 2/2006 |
| JP | 2006182604 | 7/2006 |
| JP | 2007-051057 A | 3/2007 |
| JP | 2007-512412 A | 5/2007 |
| JP | 2007-283289 A | 11/2007 |
| JP | 2001-524918 A | 10/2008 |
| JP | 2008-538349 A | 10/2008 |
| JP | 2008-273781 A | 11/2008 |
| RU | 2252913 | 5/2005 |
| WO | WO-9818884 A2 | 5/1998 |
| WO | WO 98/45212 A1 | 10/1998 |
| WO | WO-0200812 A2 | 1/2002 |
| WO | WO-0246336 A2 | 6/2002 |
| WO | WO 02/090260 A1 | 11/2002 |
| WO | WO-2004065529 A1 | 8/2004 |
| WO | WO-2004104141 A2 | 12/2004 |
| WO | WO-2005012465 A1 | 2/2005 |
| WO | 2005023728 | 3/2005 |
| WO | WO-2008002323 A2 | 1/2008 |
| WO | 2008025753 | 3/2008 |
| WO | WO 2008/030815 A2 | 3/2008 |
| WO | WO-2008030815 A2 | 3/2008 |

OTHER PUBLICATIONS

Mexican Office Action of Corresponding Mexican Application No. MX/a/2011/006461, Issued May 2, 2014.
Office Action of Corresponding U.S. Appl. No. 12/440,165, Issued Oct. 6, 2014.
Mexican Office Action of Mexican Application No. MX/a/2011/006461, issued Dec. 3, 2014.
Japanese Office Action for corresponding Japanese Patent Application No. 2014-006333 mailed Feb. 17, 2015.
Canadian Office Action mailed Mar. 26, 2015 in Canadian Application No. 2,747,547.
Non-Final Office Action mailed Apr. 9, 2015 in U.S. Appl. No. 13/140,648.
European Application Serial No. 07814661.0, European Extended Search Report mailed Aug. 16, 2011.
European Application Serial No. 07814656, European Extended Search Report dated Nov. 4, 2011.
European Search Report dated Apr. 11, 2013 in corresponding European Application Serial No. 08879024.1.
Examiner's Report dated Mar. 8, 2013 in corresponding Canadian Patent Application, Serial No. 2,662,782.
International Application Serial No. PCT/US2007/77535, International Preliminary Report on Patentability dated Oct. 22, 2008.
International Application Serial No. PCT/US2011/000858, International Search Report and Written Opinion dated Oct. 24, 2011.
International Application Serial No. PCT/US2008/087133, International Preliminary Report on Patentability dated Jun. 30, 2011.
International Application Serial No. PCT/US2007/77543, International Search Report mailed Jan. 29, 2008.
International Application Serial No. PCT/US2007/77543, International Written Opinion mailed Jan. 29, 2008.
International Application Serial No. PCT/US2007/77545, International Search Report mailed Oct. 30, 2008.
International Application Serial No. PCT/US2007/77535, International Search Report dated Dec. 12, 2007.
International Application Serial No. PCT/US2007/77545, International Written Opinion mailed Oct. 30, 2008.
International Application Serial No. PCT/US2007/77535, International Written Opinion dated Dec. 12, 2007.
International Application Serial No. PCT/US2011/000429, International Search Report and Written Opinion dated May 5, 2011, 14 pgs.
"Joint TMC/SAE Fuel Consumption Test Procedure—Type II", SAE J1321, Society of Automotive Engineers, Inc. USA (Oct. 1986), 29 pgs.
"Evaluation of Human Health Risk from Cerium Added to Diesel Fuel", HEI Communication 9, Health Effects Institute, MA, USA (Aug. 2001), 64 pgs.
"Development of Reference Doses and Reference Concentrations for Lanthanides", Prepared for The Bureau of Land Management National Applied Resource Sciences Center, Toxicology Excellence for Risk Assessment, USA, (Nov. 11, 1999), 52 pgs.
"Cerium: A Guide to Its Role in Chemical Technology", Library of Congress Catalog Card No. 92-93444 (1992), p. 11.
Aneggi, Eleanore, "Promotional Effect of Rare Earths and Transition Metals in the Combustion of Diesel Soot Over CeO2 and CeO2—ZrO2", Catalysis Today, vol. 114, Elsevier B.V., NL (2006), 40-47.
Bedrane, Sumeya, "Investigation of the Oxygen Storage Process on Ceria and Ceria-Zirconia-Supported Catalysts", Catalysis Today, vol. 75, Elsevier Science B.V., NL (2002), 401-405.
Bera, Parthasarathi, "Structural Investigation of Combustion Synthesized Cu/CeO2 Catalysts by EXAFS and Other Physical Techniques: Formation of a Ce1—xCuxO2—0 Solid Solution", Chem. Mater., vol. 14, American Chemical Society, USA (2002), 3591-3601.
Bera, Parthasarathi, "Studies on Cu/CeO2: A New NO Reduction Catalyst", Journal of Catalysis, vol. 186, Academic Press NY, USA (1999), 36-44.
Born, C., "Reduction of Soot Emission at a DI Diesel Engine by Additional Injection of Hydrogen Peroxide During Combustion", International Fall Fuels and Lubricants Meeting and Exposition, San Francisco, CA, (Oct. 19-22, 1998) SAE Techincal Paper Series, No. 982676, PA, USA.
Chen, Junping, "Rare Earth Nanoparticles Prevent Retinal Degeneration Induced by Intracellular Peroxides", Nature Nanotechnology (Nov. 2006), Nature Publishing Group, 142-150.
DeGuire, Mark R., "Point Defect Anaylsis and Microstructural Effects in Pure and Donor-Doped Ceria", Solid States Ionics, vol. 52, Elsevier Science Publishers B.V., NL (1992), 155-163.

(56) References Cited

OTHER PUBLICATIONS

Deshpande, Sameer, "Size Dependency Variation in Lattice Parameter and Valency States in Nanocrystalline Cerium Oxide", Applied Physics Letters, vol. 87, 133113-1, American Institute of Physics, USA, (2005), 3 pgs.
Griffith, W. L., "Correlating Microemulsion Fuel Composition, Structure, and Combustion Properties", Oak Ridge National Laboratory Document TM-11248, Oak Ridge, TN, US, (Jan. 1, 1989), 45 pgs.
Leubner, Ingo H., "Particle Nucleation and Growth Models", Current Opinion in Colloid & Interface Science, vol. 5, Elsevier Science Ltd., USA (2000), 151-159.
Leubner, Ingo H., "A Balanced Nucleation and Growth Model for Controlled Preceipitations", J. Dispersion Science and Technology, vol. 22, No. 1, Marcel Dekker, Inc. (2001), 125-138.
Leubner, Ingo H., "Balanced Nucleation and Growth Model for Controlled Crystal Size Distrubution", Journal of Dispersion Science and Technology, vol. 23, No. 4, Marcel Dekker, Inc. (2002), 577-590.
Mamontov, E., "Lattice Defects and Oxygen Storage Capacity of Nanocrystalline Ceria and Ceria-Ziconia", J. Phys. Chem., vol. 104, American Chemical Society, USA (2000), 11110-11116.
Norris, David J., "Doped Nancrystals", Science, vol. 319, (Mar. 28, 2008), 1776-1779.
Pang, Yong-Xin, "Aluminium Oxide Nanoparticles Prepared by Water-In-Oil Microemulsions", Journal of Materials Chemistry, vol. 12, The Royal Society of Chemistry, UK (2002), 3699-3704.
Patil, S., "Synthesis of Nanocrystalline Cerla Particles for High Temperature Oxidation Resistant Coating", Journal of Nanoparticle Research, vol. 4, Kluwer Academic Publishers, NL (2002), 433-438.
Perez-Alonso, F. J., "Synergy of FexCe1—xO2 Mixed Oxides for N2O Decomposition", Journal of Catalysis, vol. 239, Elsevier Inc., USA (2006), 340-346.
Reddy, "Surfactant-Controlled and Microwave-Assisted Synthesis of Highly Active CexZr4—xO2 Nano-Oxides for CO Oxidation", Catalysis Letters, vol. 126, No. 1-2 (2008), 125-133.
Reed, Kenneth J., "Structured Catalytic Nanoparticles and Method of Preparation", U.S. Appl. No. 61/311,418, filed Mar. 8, 2010.
Ruisheng, Hu, "Solid-Phase Synthesis of Ce—O, Fe—Ce—O Catalysts and Their Catalytic Activities in Methane Combustion", Petrochemical Technology, vol. 35, No. 4, Kon Zhi Li Lun Yu Ying Yong Bian Ji Bu, CN (2006), 319-323.
Sarkas, Harry, "Nanocrystalline Mixed Metal Oxides—Novel Oxygen Storage Materials", NSTI-Nanotech, vol. 3, CRC Press, USA (2004), 496-498.
Sathyamurthy, Srivatsan, "Reverse Micellar Synthesis of Cerium Oxide Nanoparticles", Nanotechnology, vol. 16, IOP Publishing Ltd., UK (2005), 1960-1964.
Tarnuzzer, Roy W., "Vacancy Engineered Ceria Nanostructures for Protection from Radiation-Induced Cellular Image", Nano Letters, vol. 5, No. 12, America Chemical Society, USA (2005), 2573-2577.
Terribile, Daniela, "The Preparation of High Surface Area CeO2—ZrO2 Mixed Oxides by a Surfactant-Assisted Approach", Catalysis Today, vol. 43, Elsevier Science B.V., NL (1998), 79-88.
Trovarelli, Alessandro, "Catalysis by Cerla and Related Materials", Catalytic Science Series, vol. 2, Imperial College Press, London, England (2002), 37-46.
Tsunekawa, S., "Structural Study of Monosize CeO2—x Nano-Particles", NanoStructural Materials, vol. 11, No. 1, Acta Metallurgica Inc., USA (1999), 141-147.
Tuller, H. L., "Doped Ceria as a Solid Oxide Electrolyte", Solid-State Science and Technology, vol. 122, No. 2, Journal of the Electrochemical Society, NY, USA (Feb. 1975), 255-259.
Wang, Ruigang, "Nanoscale Heterogeneity in Ceria Zirconia with Low-Temperature Redox Properties", J. Phys. Chem. B, vol. 110, American Chemical Society, USA (2006), 18278-18285.
Wang, Xianqin, "Unusual Physical and Chemical Properties of Cu in Ce1—xCuxO2 Oxide", J. Phys. Chem. B, vol. 109, American Chemical Society, USA (2005), 3591-3601.
Yang, Zongxian, "Effects of Zr Doping on Stoichlometric and Reduced Ceria: A First-Principles Study", The Journal of Chemical Physics, vol. 125, 224704, American Institute of Physics, USA (2006), 7 pgs.
Zhang, Feng, "Ceria Nanoparticles: Size, Size Distribution, and Shape", Journal of Applied Physics, vol. 95, No. 8, American Institute of Physics, USA, (Apr. 15, 2004), 4319-4326.
Zhang, Feng, "Cerium Oxide Nanoparticles: Size-Selective Formation and Structure Analysis", Applied Physics Letters, vol. 80, No. 1, American Institute of Physics, USA, (Jan. 7, 2002), 127-129.
Zhang, Fang, "Preparation of discrete nanosize ceria powder" Ceramics International, vol. 30, (2004) pp. 997-1002.
Patent Abstracts of Japan Publication No. 05-155616 dated Jun. 22, 1993.
Patent Abstracts of Japan Publication No. 2005-139029 dated Jun. 2, 2005.
Patent Abstracts of Japan Publication No. 2006-040556 dated Feb. 9, 2006.
Canadian Office Action mailed May 21, 2015 in Canadian Application No. 2,839,886.
European Office Action mailed Jun. 12, 2015 in European Application No. 0781463.6.
European Search Report mailed Jun. 25, 2015 in European Application No. 15157868.9.
Ingegard Johansson, Martin Svensson, "Surfactants based on fatty acids and other natural hydrophobes," 2001, Colloid and Interface Science, vol. 6, pp. 178-188.
Korean Office Action mailed Apr. 29, 2015 in Korean Application No. 10-2011-7016496, including English translation.
Office Action mailed Jun. 5, 2015 in U.S. Appl. No. 12/440,165.
Entire patent prosecution history of U.S. Appl. No. 12/440,165, filed Sep. 7, 2010, entitled, "Method of Preparing Cerium Dioxide Nanoparticles."
Australian Patent Examination No. 1 for corresponding Australian Pat. App. No. 2011253488, mailed Dec. 2, 2013.
Canadian Office Action for corresponding Canadian Pat. App. No. CA 2,662,765, mailed on Dec. 17, 2013.
Chinese Office Action mailed Feb. 6, 2013 for Chinese Application No. 200880132663.1.
Chinese Office Action mailed Mar. 20, 2014 for Chinese Application No. 200880132663.1.
Chinese Office Action mailed Sep. 10, 2013 for Chinese Application No. 200880132663.1.
Entire patent prosecution history of U.S. Appl. No. 12/440,171, filed Sep. 4, 2009, entitled, "Method of Conditioning an Internal Combustion Engine."
Entire patent prosecution history of U.S. Appl. No. 12/440,182, filed Sep. 4, 2009, entitled, "Cerium Dioxide Nanoparticle-Containing Fuel Additive."
Entire patent prosecution history of U.S. Appl. No. 12/549,776, filed Aug. 28, 2009, entitled, "Process for Solvent Shifting a Nanoparticle Dispersion," now U.S. Pat. No. 8,679,344, issued Mar. 25, 2014.
Entire patent prosecution history of U.S. Appl. No. 12/779,602, filed May 13, 2010, entitled, "Cerium-Containing Nanoparticles," now U.S. Pat. No. 8,883,865, issued Nov. 11, 2014.
Entire patent prosecution history of U.S. Appl. No. 13/140,648, entitled "Fuel Additive Containing Lattice Engingeered Cerium Dioxide Nanoparticles," filed Jun. 17, 2011.
Entire patent prosecution history of U.S. Appl. No. 13/444,129, filed Apr. 11, 2012, entitled, "Method of Conditioning an Internal Combustion Engine."
Entire patent prosecution history of U.S. Appl. No. 13/662,511, filed Oct. 28, 2012, entitled, "Cerium Dioxide Nanoparticle-Containing Fuel Additive."
Entire patent prosecution history of U.S. Appl. No. 14/537,161, filed Nov. 10, 2014, entitled, "Cerium-Containing Nanoparticles."
Entire patent prosecution history of U.S. Appl. No. 14/537,993, filed Nov. 11, 2014, entitled, "Cerium Oxide Containing Nanoparticles."
European Search Report dated Jan. 20, 2012 in European Application No. 07814663.6.
G. Dalwadi, H. Benson, and Y. Chen, "Comparison of Diafiltration and Tangential Flow Filtration for Purification of Nanoparticle Suspensions," Pharmaceutical Research 22 (2005) 2154-2162.

(56) References Cited

OTHER PUBLICATIONS

I. Limayem, C. Charcosset, and H. Fessi, "Purification of Nanoparticle Suspensions by a Concentration/Diafiltration Process," Separation and Purification Technology 38 (2004) 1-9.
Japanese Office Action translation for Japanese Application No. 2011-542092.
Japanese Translation of Decision of Grant mailed Nov. 19, 2013 in Japanese Application No. 2009-527516.
Mexican Office Action (English Translation only) for corresponding Mexican Pat. App. No. MX/a/2011/006461, mailed on Jun. 3, 2014.
Russian Decision of Grant issued Feb. 15, 2013 in Russian Application No. 2011129305/04(043303).
S. Sweeney, G. Woehrle, and J. Hutchison, "Rapid Purification and Size Separation of Gold Nanoparticles via Diafiltration," J. Am. Chem. Soc. (2006) 128, 3190-3197.
Swanand D. Patil, "Fundamental Aspects of Regenerative Cerium Oxide Nanoparticles and their Applications in Nanobiotechnology," pHD dissertation presented at the University of Central Florida, Summer Term 2006, downloaded from Google Advanced Scholar Search, Jan. 31, 2012.
Canadian Office Action for corresponding Canadian Pat. App. No. CA 2,662,769, mailed on Jul. 17, 2013.
Canadian Office Action for corresponding Canadian Pat. App. No. CA 2,662,782 mailed on Mar. 8, 2013.
Canadian Office Action for corresponding Canadian Pat. App. No. CA 2,662,782 mailed on Nov. 25, 2013.
Indian Office Action for corresponding Indian Pat. App. No. IN 1203/KOLNP/2009 mailed on Jan. 21, 2014.
Japanese Office Action for corresponding Japanese Pat. App. No. JP 2009-527516, mailed on Dec. 25, 2012.
Japanese Office Action for corresponding Japanese Pat. App. No. JP 2009-527516, mailed on Jul. 23, 2013.
Japanese Office Action for corresponding Japanese Pat. App. No. JP 2011-542092, mailed on Jul. 24, 2013.
Office Action mailed Jul. 22, 2015 in U.S. Appl. No. 14/537,993.
Office Action mailed Jul. 22, 2015 in U.S. Appl. No. 14/537,161.
Japanese Office Action mailed Jul. 15, 2015 for Japanese Application No. 2013-258488, including English translation.

\* cited by examiner

PROCESS FOR MAKING CERIUM DIOXIDE NANOPARTICLES

CROSS REFERENCE TO RELATED APPLICATIONS

This application is a continuation of U.S. application Ser. No. 13/444,129, filed on Apr. 11, 2012, which is a continuation U.S. application Ser. No. 12/440,171 filed Sep. 4, 2009 which is a National Stage Application of PCT/US200777543, filed Sep. 4, 2007 and claims the benefit of priority from: Provisional Application Ser. No. 60/824,514, CERIUM-CONTAINING FUEL ADDITIVE, filed Sep. 5, 2006; Provisional Application Ser. No. 60/911,159, REVERSE MICELLAR FUEL ADDITIVE COMPOSITION, filed Apr. 11, 2007; and Provisional Application Ser. No. 60/938,314, REVERSE MICELLAR FUEL ADDITIVE COMPOSITION, filed May 16, 2007, the disclosures of which are incorporated herein by reference.

FIELD OF THE INVENTION

The present invention relates to internal combustion engines and, in particular, to the conditioning of such engines through the use of fuel additives to improve their efficiency.

BACKGROUND OF THE INVENTION

Diesel fuel ranks second only to gasoline as a fuel for internal combustion engines. Trucks, buses, tractors, locomotives, ships, power generators, etc, are examples of devices that use diesel fuel. Passenger cars and sport utility vehicles are another area of potential growth for the use of diesel engines that can provide improved fuel efficiency, especially where high torque at relatively low rpm is desired.

Diesel fuel is principally a blend of petroleum-derived compounds called middle distillates (heavier than gasoline but lighter than lube oil). Diesel fuel is designed to operate in a diesel engine, where it is injected into the compressed, high-temperature air in the combustion chamber and ignites spontaneously. This differs from gasoline, which is pre-mixed with air and ignites in a gasoline engine by the spark plugs. D2 diesel fuel conforms to specification D 975 set by the American Society for Testing and Materials (ASTM).

Unlike gasoline engines that operate by spark ignition, diesel engines employ compression ignition. In order to avoid long ignition delays resulting in rough engine operation, as well as to minimize misfiring and uneven or incomplete combustion which results in smoke in the exhaust gases that causes a major environmental problem, it is highly desirable to improve the burning quality of diesel fuels to minimize environmental pollutants such as hydrocarbons, carbon monoxide, particulate matter (commonly called soot), etc.

Cetane is an alkane molecule that ignites very easily under compression, so it is assigned a cetane number (CN) of 100. In general, the cetane number (CN) depends primarily on its hydrocarbon composition. Saturated hydrocarbons, particularly those with straight, open chains, have relatively high cetane numbers, whereas unsaturated hydrocarbons have relatively low cetane numbers. All other hydrocarbons in diesel fuel are indexed to cetane as to how well they ignite under compression. The cetane number therefore measures how quickly the fuel starts to burn (auto-ignites) under diesel engine conditions. Since there are hundreds of components in diesel fuel, with each having a different cetane quality, the overall cetane number of the diesel is the average cetane quality of all the components. Cetane improvers act to increase the effective cetane number of the fuel.

It is necessary to recognize that the relationship between the CN of the diesel fuel and its performance cannot be equated in any way to the octane number of a gasoline and its performance in a spark-ignition engine. Raising the octane number allows an increase in the compression ratio and thus provides increased power and fuel economy at a particular fuel load. In contrast, in diesel engines, the desired CN provides good ignition at high loads and low atmospheric temperature. High cetane fuels eliminate engine roughness and diesel knock, allow engines to be started at lower temperatures, provide faster engine warm-up without misfiring or producing smoke and reduce formation of harmful deposits. On the other hand, too high cetane fuels can result in incomplete combustion and exhaust smoke due to too brief of an ignition delay, which does not allow proper mixing of the fuel and air.

Commercial diesel fuels have CN numbers of at least 40. The suitable diesel fuel has appropriate volatility, pour and cloud point, viscosity, gravity, flash point and contain only small but tolerable levels of sulfur. It is also important that carbon, residue formation and ash content should be kept low.

During the normal course of operation, diesel engines often develop carbon deposits on the walls of their cylinders due to incomplete combustion of fuel. These deposits can increase engine wear and, because of friction induced by the deposits, decrease engine efficiency. Incomplete fuel combustion can also lead to the environmentally harmful emission of particulate materials, also referred to as soot. Thus, fuel additives that increase fuel combustion, protect the cylinder walls of diesel engines, and decrease engine friction, resulting in greater fuel efficiency, are highly desirable.

Sanduja et al., U.S. Pat. No. 6,645,262, the disclosure of which is incorporated herein by reference, describes liquid hydrocarbon fuel concentrates, including low-sulfur diesel fuel concentrates, that include a suspension of particulate boric acid for the purpose of increasing lubricity and reducing engine wear.

Olah, U.S. Pat. No. 5,520,710, the disclosure of which is incorporated herein by reference, describes diesel fuel additives that are dissolved in the fuel and homogenously distributed and include a dialkyl, alkyl-cycloalkyl, or dicloalkyl ether compound together an alkyl or dialkyl peroxide compound for the purposes of enhancing cetane numbers and improving fuel combustion.

Peters et al., U.S. Pat. No. 6,158,397, the disclosure of which is incorporated herein by reference, describes a process for reducing soot in diesel engine exhaust gases wherein a fluid containing a peroxide compound, preferably aqueous hydrogen peroxide, is separately fed into the combustion chamber after the start of the injection and combustion of the fuel, preferably following the combustion phase.

Cunningham, U.S. Pat. No. 5,405,417, the disclosure of which is incorporated herein by reference, describes a fuel composition comprising a middle distillate base fuel having a sulfur content of less than 500 ppm and a clear cetane number in the range of 30 to 60, and a minor amount of at least one peroxy ester combustion improver such as t-butyl peroxyacetate dissolved therein.

Olsson et. al., U.S. Pat. No. 5,105,772, the disclosure of which is incorporated herein by reference, describes a process for improving combustion in an engine that comprises: injecting a liquid composition that includes a peroxide or a peroxo compound into an engine combustion chamber, and passing a portion of the composition through the exhaust outlet valve as the engine goes from the exhaust phase to the intake phase, the passing occurring during the step of injecting.

Mellovist et al., U.S. Pat. No. 4,359,969, the disclosure of which is incorporated herein by reference, describes a method of improving fuel combustion that comprises: introducing a liquid composition consisting essentially a 1-10% hydrogen peroxide, 50-80% water, and 15-45% of a $C_1$-$C_4$ aliphatic alcohol, all by volume, in the form of fine droplets into the air intake manifold of an engine, where the droplets mix with air or fuel-air mixture prior to entering the combustion chamber. Preferably, the liquid composition also contains up to 5% of a thin lubricating oil and up to 1% of an anticorrosive.

Kracklaurer, U.S. Pat. No. 4,389,220, the disclosure of which is incorporated herein by reference, describes a method of conditioning diesel engines in which a diesel engine is operated on a diesel fuel containing from about 20-30 ppm of diclopentadienyl iron for a period of time sufficient to eliminate carbon deposits from the combustion surfaces of the engine and to deposit a layer of iron oxide on the combustion surfaces, which layer is effective to prevent further buildup of carbon deposits. Subsequently, the diesel engine is operated on a maintenance concentration of from about 10-15 ppm of dicyclopentadienyl iron or an equivalent amount of a derivative thereof on a continuous basis. The maintenance concentration is effective to maintain the catalytic iron oxide layer on the combustion surfaces but insufficient to decrease timing delay in the engine. The added dicyclopentadienyl iron may produce iron oxide on the engine cylinder surface ($Fe_2O_3$), which reacts with carbon deposits (soot) to form Fe and $CO_2$, thereby removing the engine by formation of rust.

Valentine, et al., U.S. Patent Appl. Publ. No. 2003/0148235, the disclosure of which is incorporated herein by reference, describe specific bimetallic or trimetallic fuel-borne catalysts for increasing the fuel combustion efficiency. The catalysts reduce fouling of heat transfer surfaces by unburned carbon while limiting the amount of secondary additive ash which may itself cause overloading of particulate collector devices or emissions of toxic ultra fine particles when used in forms and quantities typically employed. By utilizing a fuel containing a fuel-soluble catalyst comprised of platinum and at least one additional metal comprising cerium and/or iron, production of pollutants of the type generated by incomplete combustion is reduced. Ultra low levels of nontoxic metal combustion catalysts can be employed for improved heat recovery and lower emissions of regulated pollutants. However, fuel additives of this type, in addition to using the rare and expensive metals such as platinum, can require several months before the engine is "conditioned". By "conditioned" is meant that all the benefits of the additive are not obtained until the engine has been operated with the catalyst for a period of time. Initial conditioning may require 45 days and optimal benefits may not be obtained until 60-90 days. Additionally, free metal may be discharged from the exhaust system into the atmosphere, where it may subsequently react with living organisms.

Cerium dioxide is widely used as a catalyst in converters for the elimination of toxic exhaust emission gases and the reduction in particulate emissions in diesel powered vehicles. Within the catalytic converter, the cerium dioxide can act as a chemically active component, acting to release oxygen in the presence of reductive gases, as well as to remove oxygen by interaction with oxidizing species.

Cerium dioxide may store and release oxygen by the reversible process shown in equation 1.

$$2CeO_2 \leftrightarrow Ce_2O_3 + \tfrac{1}{2} O_2 \qquad \text{(eq. 1)}$$

The redox potential between the $Ce^{3-}$ and $Ce^{4+}$ ions lies between 1.3 and 1.8V and is highly dependent upon the anionic groups present and the chemical environment (CERIUM. A Guide to its Role in Chemical Technology, 1992 by Molycorp, Inc, Library of Congress Catalog Card Number 92-93444)). This allows the foregoing reaction to easily occur in exhaust gases. Cerium dioxide may provide oxygen for the oxidation of CO or hydrocarbons in an oxygen starved environment, or conversely may absorb oxygen for the reduction of nitrogen oxides (NOx) in an oxygen rich environment. Similar catalytic activity may also occur when cerium dioxide is added as an additive to fuel, for example, diesel or gasoline. However, for this effect to be useful, the cerium dioxide must be of a particle size small enough, i.e., nanoparticulate (<100 nm), to remain in a stable dispersion in the fuel. In addition, as catalytic effects depend on surface area, the small particles size renders the nanocrystalline material more effective as a catalyst. The incorporation of cerium dioxide in fuel serves not only to act as a catalyst to reduce toxic exhaust gases produced by fuel combustion, for example, by the "water gas shift reaction"

$$CO + H_2O \rightarrow CO_2H_2,$$

but also to facilitate the burning off of particulates that accumulate in the particulate traps typically used with diesel engines.

Cerium dioxide nanoparticles are particles that have a mean diameter of less than 100 nm. For the purposes of this disclosure, unless otherwise stated, the diameter of a nanoparticle refers to its hydrodynamic diameter, which is the diameter determined by dynamic light scattering technique and includes molecular adsorbates and the accompanying solvation shell of the particle. Alternatively, the geometrical particles diameter may be estimated using transmission electron micrography.

Vehicle on-board dosing systems that dispense cerium dioxide into the fuel before it enters the engines are known, but such systems are complicated and require extensive electronic control to feed the appropriate amount of additive to the fuel. To avoid such complex on-board systems, cerium dioxide nanoparticles can also be added to fuel at an earlier stage to achieve improved fuel efficiency. They can, for example, be incorporated at the refinery, typically along with processing additives such as, for example, cetane improvers or added at a fuel distribution tank farm.

Cerium dioxide nanoparticles can also be added at a fuel distribution center, where it can be rack injected into large (~100,000 gal) volumes of fuel or at a smaller fuel company depot, which would allow customization according to specified individual requirements. In addition, the cerium dioxide may be added at a filling station during delivery of fuel to a vehicle, which would have the potential advantage of improved stabilization of the particle dispersion.

Fuel additives, such as PuriNOx™ manufactured by Lubrizol Corporation, have been developed that are useful for the reduction of NOx and particulate material emissions, however, the composition of these fuel additives often includes 15-20% water. This "emulsified" fuel additive is commonly mixed with fuel at a level of 5-10%. The resulting high water content can lead to a loss in engine power and lower fuel economy. Thus it would be desirable to formulate a fuel additive that afforded reduction in nitrogen oxide and particulate material emissions, while simultaneously maintaining optimum engine performance.

Cerium nanoparticles and the associated free radical initiators (incorporated into reverse micelles), as described below, can provide a possible solution to this problem.

Cerium nanoparticles can form a ceramic layer on the engine cylinders and moving parts essentially turning the engine into a catalytic device. Their catalytic efficiency derives from the fact that they provide a source of oxygen atoms during combustion by undergoing reduction according to the equation (1). This results in better fuel combustion and reduced levels of particulate material emissions. Additionally, when used as a fuel additive, these nanoparticles can provide improved engine performance by reducing engine friction. As an alternative mode of introduction, cerium dioxide nanoparticles can be added to the lube oil and act as a lubricity enhancing agent to reduce internal friction. This will also improve fuel efficiency.

Although substantially pure cerium dioxide nanoparticles are beneficially included in fuel additives, it may be of further benefit to use cerium dioxide doped with components that result in the formation of additional oxygen vacancies being formed. For this to occur, the dopant should be divalent or trivalent, i.e., a divalent or trivalent ion of an element that is a rare earth metal, a transition metal or a metal of Group IIA, IIIB, VB, or VIB of the Periodic Table, and a size that allows incorporation of the ion in a lattice position within the surface or sub-surface region of the cerium dioxide nanoparticles. This substitutional ion doping is preferred to interstitial ion doping, where the dopants occupy spaces between the normal lattice positions. The following publications, the disclosures all of which are incorporated herein by reference, describe fuel additives containing cerium oxidic compounds.

Hawkins et al., U.S. Pat. No. 5,449,387, discloses a cerium (IV) oxidic compound having the formula:

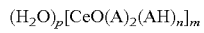

in which the radicals A, which are the same or different, are each an anion of an organic oxyacid AH having a $pK_a$ greater than 1, p is an integer ranging from 0 to 5, n is a number ranging from 0 to 2, and m is an integer ranging from 1 to 12. The organic oxyacid is preferably a carboxylic acid, more preferably, a $C_2$-$C_{20}$ monocarboxylic acid or a $C_4$-$C_{12}$ dicarboxylic acid. The cerium-containing compounds can be employed as catalysts for the combustion of hydrocarbon fuels.

Valentine et al., U.S. Pat. No. 7,063,729, discloses a low-emissions diesel fuel that includes a bimetallic, fuel-soluble platinum group metal and cerium catalyst, the cerium being provided as a fuel-soluble hydroxyl oleate propianate complex.

Chopin et al., U.S. Pat. No. 6,210,451, discloses a petroleum-based fuel that includes a stable organic sol that comprises particles of cerium dioxide in the form of agglomerates of crystallites (preferred size 3-4 nm), an araphiphilic acid system containing at least one acid whose total number of carbons is at least 10, and an organic diluent medium. The controlled particle size is no greater than 200 nm.

Birchem et al., U.S. Pat. No. 6,136,048, discloses an adjuvant for diesel engine fuels that includes a sol comprising particles of oxygenated compound having a d90 no greater than 20 nm, an amphiphilic acid system, and a diluent. The oxygenated metal compound particles are prepared from the reaction in solution of a rare earth salt such as a cerium salt with a basic medium, followed by recovery of the formed precipitate by atomization or freeze drying.

Lemaire et al., U.S. Pat. No. 6,093,223, discloses a process for producing aggregates of ceric oxide crystallites by burning a hydrocarbon fuel in the presence of at least one cerium compound. The soot contains at least one 0.1 wt. % or ceric oxide crystallite aggregates, the largest particle size being 50-10,000 angstroms, the crystallite size being 50-250 angstroms, and the soot having an ignition temperature of less than 400° C.

Hazarika et al., U.S. Patent Appl. Publ. No. 2003/0154646, discloses a method of improving fuel efficiency and/or reducing fuel emissions of a fuel burning apparatus, the method comprising dispersing at least one particulate lanthanide oxide, particularly cerium dioxide, in the fuel, wherein the particulate lanthanum oxide is coated with a surfactant selected from the group consisting of alkyl carboxylic anhydrides and esters having at least one $C_{10}$ to $C_{30}$ alkyl group.

Collier et al., U.S. Patent Appl. Publ. No. 2003/0182848, discloses a diesel fuel composition that improves the performance of diesel fuel particulate traps and contains a combination of 1-25 ppm of metal in the form of a metal salt additive and 100-500 ppm of an oil-soluble nitrogen-containing ashless detergent additive. The metal may be alkali metal, an alkaline earth metal, a metal of Group IVB, VIIB, VIIIB, IB, IIB or any of the rare earth metals having atomic numbers 57-71, especially cerium, or mixtures of any of the foregoing metals.

Collier et al., U.S. Patent Appl. Publ. No. 2003/0221362, discloses a fuel additive composition for a diesel engine equipped with a particulate trap, the composition comprising a hydrocarbon solvent and an oil-soluble metal carboxylate or metal complex derived from a carboxylic acid containing not more than 125 carbon atoms. The metal may be an alkali metal, an alkaline earth metal, a metal of Group IVB, VIIB, VIIIB, IB, IIB, or a rare earth metal, including cerium, or mixtures of any of the foregoing metals.

Caprotti et al., U.S. Patent Appl. Publ. No. 2004/0035045, discloses a fuel additive composition for a diesel engine equipped with a particulate trap. The composition comprises an oil-soluble or oil-dispersible metal salt of an acidic organic compound and a stoichiometric excess of metal. When added to the fuel, the composition provides 1-25 ppm of metal, which is selected from the group consisting of Ca, Fe, Mg, Sr, Ti, Zr, Mn, Zn, and Ce.

Caprotti et al., U.S. Patent Appl. Publ. No. 2005/0060929, discloses a diesel fuel composition stabilized against phase separation that contains a colloidally dispersed or solubilized metal catalyst compound and 5-1000 ppm of a stabilizer that is an organic compound having a lipophilic hydrocarbyl chain attached to at least two polar groups, at least one of which is a carboxylic acid or carboxylate group. The metal catalyst compound comprises one or more organic or inorganic compounds or complexes of Ce, Fe, Ca, Mg, Sr, Na, Mn, Pt, or mixtures thereof.

Wakefield, U.S. Pat. No. 7,169,196 B2, discloses a fuel comprising cerium dioxide particles that have been doped with a divalent or trivalent metal or metalloid that is a rare earth metal, a transition metal, or a metal of Group IIa, IIIB, VB, VIB of the Periodic Table.

Caprotti et al., U.S. Patent Appl. Publ. No. 2006/0000140, discloses a fuel additive composition that comprises at least one colloidal metal compound or species and a stabilizer component that is the condensation product of an aldehyde or ketone and a compound comprising one or more aromatic moieties containing a hydroxyl substituent and a further substituent chosen from among hydrocarbyl, —COOR, or —COR, R being hydrogen or hydrocarbyl. The colloidal metal compound preferably comprises at least one metal oxide, preferred oxides being iron oxide, cerium oxide, or cerium-doped iron oxide.

Scattergood, International Publ. No. WO 2004/065529, discloses a method for improving the fuel efficiency of fuel for an internal combustion engine that comprises adding to the fuel cerium dioxide and/or doped cerium dioxide and, optionally, one or more fuel additives.

Anderson et al., International Publ. No. WO 2005/012465, discloses a method for improving the fuel efficiency of a fuel for an internal combustion engine that comprises lubricating oil and gasoline, the method comprising adding cerium dioxide and/or doped cerium dioxide to the lubricating oil or the gasoline.

Cerium-containing nanoparticles can be prepared by a variety of techniques known in the art. Regardless of whether the synthesized nanoparticles are made in a hydrophilic or hydrophobic medium, the particles normally require a stabilizer to prevent undesirable agglomeration. The following publications, the disclosures all of which are incorporated herein by reference, describe some of these synthetic techniques.

Talbot et al., U.S. Pat. No. 6,752,979, discloses a method of producing metal oxide particles having nano-sized grains that consists of: mixing a solution containing one or more metal cations with a surfactant under conditions such that surfactant micelles are formed within the solution, thereby forming a micellar liquid, and heating the micellar liquid to remove the surfactant and form metal oxide particles having a disordered pore structure. The metal cations are selected from the group consisting of cations from Groups 1A, 2A, 3A, 4A, 5A, and 6A of the Periodic Table, transition metals, lanthanides, actinides, and mixtures thereof. Preparations of particles of cerium dioxide and mixed oxides containing cerium and one or more other metals are included in the illustrative examples.

Chane-Ching et al., U.S. Pat. No. 6,271,269, discloses a process for preparing storage-stable organic sols that comprises: reacting a base reactant with an aqueous solution of the salt of an acidic metal cation to form an aqueous colloidal dispersion containing excess hydroxyl ions, contacting the aqueous colloidal dispersion with an organic phase comprising an organic liquid medium and an organic acid, and separating the resulting aqueous/organic phase mixture into an aqueous phase and a product organic phase. Preferred metal cations are cerium and iron cations. The colloidal particulates have hydrodynamic diameters in the range of 50-2000 angstroms.

Chane-Ching, U.S. Pat. No. 6,649,156, discloses an organic sol containing cerium dioxide particles that are made by a thermal hydrolysis process; an organic liquid phase; and at least one amphiphilic compounds chosen from polyoxyethylenated alkyl ethers of carboxylic acids, polyoxyethylenated alkyl ether phosphates, dialkyl sulfosuccinates, and quarternary ammonium compounds. The water content of the sols may not be more than 1%. The mean crystallite size is about 5 nm, while the particles agglomerates of these crystallites range in size from 200 to 10 nm.

Chane-Ching, U.S. Pat. No. 7,008,965, discloses an aqueous colloidal dispersion of a compound of cerium and at least one other metal, the dispersion having a conductivity of at most 5 mS/cm and a pH between 5 and 8.

Chane-Ching, U.S. Patent Appl. Publ. No. 2004/0029978 (abandoned Dec. 7, 2005), discloses a surfactant formed from at least one nanoparticles that has amphiphilic characteristics and is based on a metal oxide, hydroxide and/or oxyhydroxide, on the surface of which organic chains with hydrophobic characteristics are bonded. The metal is preferably selected from among cerium, aluminum, titanium or silicon, and the alkyl chain comprises 6-30 carbon atoms, or polyoxyethylene monoalkyl ethers of which the alkyl chain comprises 8-30 carbon atoms and the polyoxyethylene part comprises 1-10 ethyoxyl groups. The particles is an isotopic or spherical particles having an average diameter of 2-40 nm.

Blanchard et al., U.S. Patent Appl. Publ. No. 2006/0005465, discloses an organic colloidal dispersion comprising: particles of at least one compound based on at least one rare earth, at least one acid, and at least one diluent, wherein at least 90% of the particles are monocrystalline. Example 1 describes the preparation of a cerium dioxide colloidal solution from cerium acetate and an organic phase that includes Isopar hydrocarbon mixture and isostearic acid. The resulting cerium dioxide particles had a $d_{50}$ of 2.5 nm, and the size of 80% of the particles was in the range of 1-4 nm.

Zhou et al., U.S. Pat. No. 7,025,943, discloses a method for procuring cerium dioxide crystals that comprises: mixing a first solution of a water-soluble cerium salt with a second solution of alkali metal or ammonium hydroxide; agitating the resulting reactant solution under turbulent flow conditions while concomitantly passing gaseous oxygen through the solution, and precipitating cerium dioxide particles having a dominant particle size within the range of 3-100 nm. In Example 1, the particles size is stated to be around 3-5 nm.

Noh et al., U.S. Patent Appl. Publ. No. 2004/0241070, discloses a method for preparing single crystalline cerium dioxide nanopowder comprising: preparing cerium hydroxide by precipitating a cerium salt in the presence of a solvent mixture of organic solvent and water, preferably in a ratio of about 0.1:1 to about 5:1 by weight; and hydrothermally reacting the cerium hydroxide. The nanopowder has a particle size of about 30-300 nm.

Chan, U.S. Patent Appl. Publ. No. 2005/0031517, discloses a method for preparing cerium dioxide nanoparticles that comprises: rapidly mixing an aqueous solution of cerium nitrate with aqueous hexamethylenetetramine, the temperature being maintained at a temperature no higher than about 320° K. while nanoparticles form in the resulting mixture; and separating the formed nanoparticles. The mixing apparatus preferably comprises a mechanical stirrer and a centrifuge. In the illustrative example, the prepared cerium dioxide particles are reported to have a diameter of about 12 nm.

Ying et al., U.S. Pat. Nos. 6,413,489 and 6,869,584, disclose the synthesis by a reverse micelle technique of nanoparticles that are free of agglomeration and have a particle size of less than 100 nm and a surface area of at least 20 $m^2/g$. The method comprises introducing a ceramic precursor that includes barium alkoxide and aluminum alkoxide in the presence of a reverse emulsion.

Illustrative example 9 of U.S. Pat. Nos. 6,413,489 and 6,869,584 describes the inclusion of cerium nitrate in the emulsion mixture to prepare cerium-doped barium hexaaluminate particles, which were collected by freeze drying and calcined under air to 500° C. and 800° C. The resulting particles had grain sizes of less than 5 nm and 7 nm at 500° C. and 800° C., respectively. Illustrative example 10 describes the synthesis of cerium-coated barium hexaaluminate particles. Following calcination, the cerium-coated particles had grain sizes of less than 4 nm, 6.5 nm, and 16 nm at 500° C., 800° C., and 1100° C., respectively.

A related publication, Ying et al., U.S. Patent Appl. Publ. No. 2005/0152832, discloses the synthesis, by a reverse micelle technique within an emulsion having a 1-40% water content of nanoparticles that are free of agglomeration and have a particle size of less than 100 nm. The nanoparticles are preferably metal oxide particles, which can be used to oxidize hydrocarbons.

Illustrative Examples 9 and 10 of U.S. Patent Appl. Publ. No. 2005/0152832 describe the preparation of, respectively, cerium-doped and cerium coated barium hexaaluminate particles. Example 13 describes the oxidation of methane with the cerium-coated particles.

Hanawa et al., U.S. Pat. No. 5,938,837, discloses a method for preparing cerium dioxide particles, intended primarily for use as a polishing agent, that comprises mixing, with stirring, an aqueous solution of cerous nitrate with a base, preferably aqueous ammonia, in such a mixing ratio that the pH value of the mixture ranges from 5 to 10, preferably 7 to 9, then rapidly heating the resulting mixture to a temperature of 70-100° C., and maturing the mixture of cerous nitrate with a base at that temperature to form the grains. The product grains are uniform in size and shape and have an average particle size of 10-80 nm, preferably 20-60 nm.

European Patent Application EP 0208580, published 14 Jan. 1987, inventor Chane-Ching, applicant Rhone Poulenc, discloses a cerium (IV) compound corresponding to the general formula

wherein M represents an alkali metal or quarternary ammonium radical, x is between 0.01 and 0.2, y is such that y=4−z+x, and z is between 0.4 and 0.7. A process for preparing a colloidal dispersion of the cerium (IV) compound produces particles with a hydrodynamic diameter between about 1 nm and about 60 nm, suitably between about 1 nm and about 10 nm, and desirably between about 3 nm and 8 nm.

The doping of cerium dioxide with metal ions (reported as early as 1975) and the resultant dopant effects on the electronic and oxygen diffusion properties are well described by Trovarelli, Catalysts by Ceria and Related Materials. *Catalytic Science Series*, World Scientific Publishing Co., 37-46 (2002) and references cited therein.

S. Sathyamurthy et al., *Nano Technology* 16, (2005), pp 1960-1964, describes the reverse micellar synthesis of $CeO_2$ from cerium nitrate, using sodium hydroxide as the precipitating agent and n-octane containing the surfactant cetyltrimethylammonium bromide (CTAB) and the cosurfactant 1-butanol as the oil phase. The resulting polyhedral particles had an average size of 3.7 nm, but the reaction would be expected to proceed in low yield.

S. Seal et al., *Journal of Nano Particle Research*, (2002), p 438, describes the preparation from cerium nitrate and ammonium hydroxide of nanocrystalline ceria particles for a high-temperature oxidation-resistant coating using an aqueous microemulsion system containing AOT as the surfactant, and toluene as the oil phase. The ceria nanoparticles formed in the upper oil phase of the reaction mixture had a particle size of 5 nm.

Pang et al., *J. Mater. Chem.* 12 (2002), pp 3699-3704, prepared $Al_2O_3$ nanoparticles by a water-in-oil microemulsion method, using an oil phase containing cyclohexane and the non-ionic surfactant Triton X-114, and an aqueous phase containing 1.0 M $AlClO_3$. The resulting $Al_2O_3$ particles, which had a particle size of 5-15 nm, appeared to be distinctly different from the hollow ball-shaped particles of submicron size made by a direct precipitation process.

Cuif et al., U.S. Pat. No 6,133,194, the disclosure of which is incorporated herein by reference, describes a process that comprises reacting a metal salt solution containing cerium, zirconium, or a mixture thereof, a base, optionally an oxidizing agent, and an additive selected from the group consisting of anionic surfactants, nonionic surfactants, polyethylene glycols, carboxylic acids, and carboxylate salts, thereby forming a product. The product is subsequently calcined at temperatures >500 C. (which would effectively carbonize the claimed surfactants).

Hazbun et al., U.S. Pat. No. 4,744,796, the disclosure of which is incorporated herein by reference, describes a microemulsion fuel composition that includes a hydrocarbon fuel and a cosurfactant combination of t-butyl alcohol and at least one amphoteric, anionic, cationic, or nonionic surfactant. Preferred surfactants are fatty acids or fatty acid mixtures.

Hicks et al., U.S. Patent Appl. Publ. No. 2002/0095859, the disclosure of which is incorporated herein by reference, describes additive compositions for liquid hydrogen fuels that include one or more surfactants selected from the group consisting of amphoteric, anionic, cationic, or nonionic surfactants, and optionally one or more cosurfactants selected from the group consisting of alcohols, glycols, and ethers.

As described previously, various methods and apparatus have been reported for preparing cerium nanoparticles including those described by Chane-Ching, et al., U.S. Pat. No. 5,017,352. Hanawa, et al., U.S. Pat. No. 5,938,837; Melard, et al., U.S. Pat. No. 4,786,325; Chopin, et al., U.S. Pat. No. 5,712,218; Chan. U.S. Patent Appl. Publ. No. 2005/0031517; and Zhou, et al., U.S. Pat. No. 7,025,943, the disclosures of which are incorporated herein by reference. However, current methods do not allow the economical and facile preparation of cerium nanoparticles in a short period of time at very high suspension densities (greater than 0.5 molal, i.e., 9 wt. %) that are sufficiently small in size (less than 8 nm in mean diameter), uniform in size frequency distribution (coefficient of variation [COV] of less than 15%, where COV is the standard deviation divided by the mean diameter), and stable for many desirable applications.

A typical chemical reactor that might be used to prepare cerium dioxide includes a reaction chamber that includes a mixer (see, for example, FIG. 1 in Zhou et al. U.S. Pat. No. 7,025,943). A mixer typically includes a shaft, and propeller or turbine blades attached to the shaft, and a motor that turns the shaft, such that the propeller is rotated at high speed (1000 to 5000 rpm). The shaft can drive a flat blade turbine for good meso mixing (micro scale) and a pitched blade turbine for macro mixing (pumping fluid through out the reactor).

Such a device is described in Antoniades, U.S. Pat. No. 6,422,736, entitled "Scaleable Device Impeller Apparatus For Preparing Silver Halide Grains." This type of reactor is useful for fast reactions such as that shown by the equation below, wherein the product, AgCl, is a crystalline material having a diameter on the order of several hundred nanometers up to several thousand nanometers.

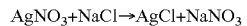

Cerium dioxide particles prepared using this type of mixing are often too large to be useful for certain applications. It is highly desirable to have the smallest cerium dioxide particles possible as their catalytic propensity (ability to donate oxygen to a combustion system, i.e., equation 1) increases with decreasing particle size, especially for particles having a mean diameter of less than 10 nm.

A schematic example of a batch reactor that can be used to produce cerium dioxide nanoparticles is shown in FIG. 1. The reactor (10) includes inlet ports (11, and 12) for adding reactants, a propeller, shaft, and motor, 15, 14, and 13, for mixing. The reaction mixture 18 is contained in a reactor vessel 16. Addition of reactants, such as cerium nitrate, an oxidant, and hydroxide ion, can result in the formation of nanoparticles. The particles initially form as very small nuclei. Mixing causes the nuclei to circulate, shown by the dashed arrows (17) in FIG. 1. As the nuclei continuously circulate through the reactive mixture regime they grow (increase in diameter) as they incorporate fresh reactants. Thus, after an initial steady state concentration of nuclei is formed, this nuclei population is subsequently grown into larger particles in a continuous manner. This nucleation and growth process is not desirable if one wishes to limit the final size of the particles while still maintaining a high particles suspension density. Such a batch reactor is not useful for producing a high yield (greater than 1 molal) of cerium dioxide nanoparticles that are very small, for example, less than 10 nm in a reasonably short reaction time (for example, less than 60 minutes).

An example of this nucleation and growth process applied to the aqueous precipitation of $CeO_2$ is the work of Zhang et al., *J. Appl. Phys.*, 95, 4319 (2004) and Zhang, et al., *Applied Physics Letters*, 80, 127 (2002). Using cerium nitrate hexahydrate as the cerium source (very dilute at 0.0375 M) and 0.5 M hexamethylenetetramine as the ammonia precursor, 2.5 to 4.25 nm cerium dioxide particles are formed in times that are less than 50 minutes. These particles are subsequently grown to 7.5 nm or greater using reaction times on the order of 250 minutes (or 600 minutes depending upon growth conditions). The limitations of particle size, concentration and reaction time would exclude this process from consideration as an economically viable route to bulk commercial quantities of $CeO_2$ nanoparticles.

I. H. Leubner, *Current Opinion in Colloid and Interface Science*, 5, 151-159 (2000), *Journal of Dispersion Science and Technology*, 22, 125-138 (2001) and ibid. 23, 577-590 (2002), and references cited therein, provides a theoretical treatment that relates the number of stable crystals formed with molar addition rate of reactants, solubility of the crystals and temperature. The model also accounts for the effect of diffusion, kinetically controlled growth processes. Ostwald ripening agents and growth restrainers/stabilizers on crystal number. High molar addition rates, low temperatures, low solubility, and the presence of growth restrainers all favor large numbers of nuclei and consequently smaller final grain or particle size.

In contrast to batch reactors, colloid mills typically have flat blade turbines turning at 10,000 rpm, whereby the materials are forced through a screen whose holes can vary in size from fractions of a millimeter to several millimeters. Generally, no chemical reaction is occurring, but only a change in particle size. In certain cases, particle size and stability can be controlled thermodynamically by the presence of a surfactant. For example, Langer et al., in U.S. Pat. No. 6,368,366 and U.S. Pat. No. 6,363,237, incorporated herein be reference, describe an aqueous microemulsion in a hydrocarbon fuel composition under high shear conditions. However, the aqueous particle phase (the discontinuous phase in the fuel composition) has a large size, on the order of 1000 nm.

Colloid mills are not useful for reducing the particle size of large cerium dioxide particles because the particles are too hard to be sheared by the mill in a reasonable amount of time. The preferred method for reducing large, agglomerated cerium dioxide particles from the micron size down into the nanometer size is milling for several days on a ball mill in the presence of a stabilizing agent. This is a time consuming, expensive process that invariably produces a wide distribution of particle sizes. Thus, there remains a need for an economical and facile method to synthesize large quantities (at high suspension densities) of very small nanometric particles of cerium dioxide with a uniform size distribution.

Aqueous precipitation may offer a convenient route to cerium nanoparticles. However, to be useful as a fuel-borne catalyst for fuels, cerium dioxide nanoparticles must exhibit stability in a nonpolar medium (for example, diesel fuel). Most stabilizers used to prevent agglomeration in an aqueous environment are ill suited to the task of stabilization in a nonpolar environment. When placed in a nonpolar solvent, such particles tend to immediately agglomerate and, consequently, lose some, if not all, of their desirable nanoparticulate properties. Thus it would be desirable to form stable cerium dioxide particles in an aqueous environment, retain the same stabilizer on the particle surface, and then be able to transfer these particles to a nonpolar solvent, wherein the particles would remain stable and form a homogenous mixture. In this simplified and economical manner, one could eliminate the necessity for changing surface stabilizer's affinity from polar to non-polar. Changing stabilizers can involve a difficult displacement reaction or separate, tedious isolation-dispersal methods (for example, precipitation and subsequent redispersal with the new stabilizer using ball milling).

Thus, there remains a need for an efficient and economical method to synthesize stable cerium dioxide nanoparticles in a polar, aqueous environment, and then transfer these particles to a non-polar environment wherein a stable homogenous mixture is formed.

For some applications, it may even be desirable to have some relatively low level of water present during the combustion process of an internal combustion engine. The previously mentioned, Hicks et al., U.S. Patent Appl. Publ. No. 2002/0095859 suggests that as little as 5 to 95 ppm water (as a microemulsion) improves hydrocarbon fuel combustion via the reduction of cyclic dispersion (variability between compression cycle).

Water added to diesel fuel is thought to improve combustion in three ways:
1. Water promotes a finer, more even spray pattern for more complete combustion.
2. Water lowers the combustion temperature to reduce nitrous oxide emissions (flame temperature of 2900° F.).
3. Water delays combustion slightly to reduce particulate emissions.

J. Ying et al in WO 98/18884 describe a thermally and temporally stable water-in-fuel emulsion having micelle size of <100 nm and including water in an amount of at least 8 wt. percent. As there was no attendant measurement of engine power, the claimed 85-90% reductions in particulate emissions may have been an artifact of the loss of engine power and thus been an unacceptable trade-off of power for emissions reduction. Fuel additives that include cerium dioxide nanoparticles, wherein nanoparticles typically have a mean diameter of 100 nm or less, stabilized with a surfactant, such as sodium dodecyl succinate, and optionally containing copper, are known. These types of fuel additives also have a long conditioning period.

The use of cerium nanoparticles to provide a high temperature oxidation resistant coating has been reported, for example, see "Synthesis Of Nano Crystalline Ceria Particles For High Temperature Oxidization Resistant Coating," S. Seal et al., *Journal of Nanoparticle Research*, 4, 433-438 (2002). The deposition of cerium dioxide on various surfaces has been investigated, including Ni, chromia and alumina alloys, and stainless steel and on Ni, and Ni—Cr coated alloy surfaces. It was found that a cerium dioxide particle size of 10 nm or smaller is desirable. Ceria particle incorporation subsequently inhibits oxidation of the metal surface.

In addition, the extent to which $CeO_2$ can act as a catalytic oxygen storage material, described by equation 1, is governed in part by the $Ceo_2$ particle size. At 20 nm particle sizes and below, the lattice parameter increases dramatically with decreasing crystallite size (up to 0.45% at 6 nm, see for example Zhang, et al., *Applied Physics Letters*, 80 1, 127 (2002)). The associated size induced lattice strain is accompanied by an increase in surface oxygen vacancies that results in enhanced catalytic activity. This (inverse) size dependent activity provides not only for more efficient fuel cells, but better oxidative properties when used in the combustion of petroleum fuels.

Henly, U.S. Patent Appl. Publ. No. 2005/0005506, the disclosure of which is incorporated herein by reference, has described a distillate fuel additive composition, including calcium sulfonate detergent, a succinimide dispersant and an organomanganese compound. The organic manganese compound, along with other compounds, acts to improve the cleanliness of the fuel system.

Rim, U.S. Pat. No. 6,892,531, the disclosure of which is incorporated herein by reference, describes an engine lubricating oil composition for a diesel engine that includes a lubricating oil and 0.05-10 wt. % of a catalyst additive comprising cerium carboxylate.

As described above, currently available fuel additives have improved the performance of diesel engines; however further improvements are still needed. It would be desirable to formulate a fuel additive for diesel engines that provides: improved fuel combustion while maintaining engine power while simultaneously reducing, reduced PM emissions. In addition, protection of engines from wear, reduced engine friction, greater lubricity, with improved fuel efficiency would be tremendously beneficial. It would also be desirable to provide one or more of these features without requiring a long conditioning period.

SUMMARY OF THE INVENTION

The present invention is directed to a method of improving the efficiency of a diesel engine provided with a source of diesel fuel, wherein the method comprises the steps of: a) adding to the diesel fuel a reverse micellar composition comprising an aqueous first disperse phase that includes a free radical initiator and a first continuous phase that includes a first hydrocarbon liquid, a first surfactant, and optionally a co-surfactant, thereby producing a modified diesel fuel; and b) operating the engine, thereby combusting the modified diesel fuel.

The present invention is further directed to a method of improving the efficiency of a diesel engine provided with a source of diesel fuel and a source of lubricating oil, wherein the method comprises the steps of a) adding to the diesel fuel a reverse micellar composition comprising an aqueous first disperse phase that includes a free radical initiator and a, first continuous phase that includes a first hydrocarbon liquid and a first surfactant, thereby producing a modified diesel fuel; b) adding to the lubricating oil a stabilized nanoparticulate composition of cerium dioxide, thereby producing a modified lubricating oil; and e) operating the engine, thereby combusting the modified diesel fuel, and lubricating the engine with the modified lubricating oil.

The present invention is also directed to a method of improving the efficiency of a diesel engine provided with a source of diesel fuel, wherein the method comprises the steps of a) adding to the diesel fuel a first reverse micellar composition that includes an aqueous first disperse phase comprising boric acid or a borate salt and a first continuous phase that includes a first hydrocarbon liquid, a first surfactant, and optionally a co-surfactant; and b) operating the engine.

DETAILED DESCRIPTION OF THE INVENTION

Figure 1:
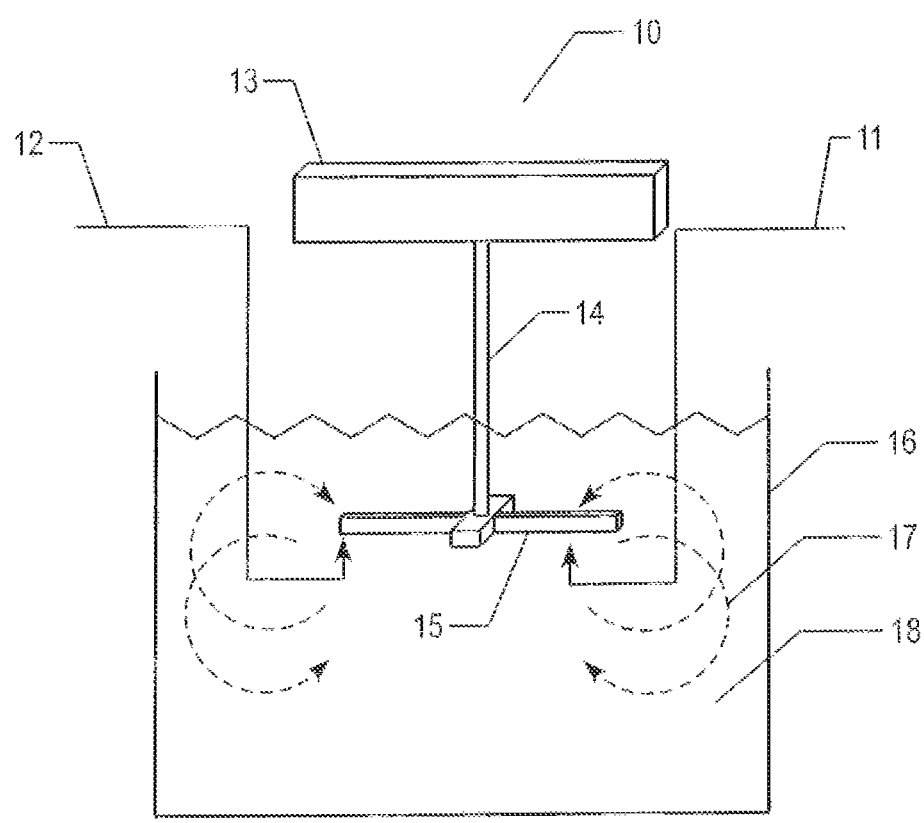
FIG. 1 shows a schematic representation of a conventional batch reactor for forming cerium dioxide nanoparticles.

The preparation of cerium dioxide nanoparticles is described in co-pending, commonly assigned Application Serial No. PCT/US07/077545, METHOD OF PREPARING CERIUM DIOXIDE NANOPARTICLES, filed Sep. 4, 2007, the disclosure of which is incorporated herein by reference.

Cerous ion reacts, in the presence of hydroxide ion, to form cerium hydroxide. The reaction vessel is then heated to convert cerium hydroxide to cerium dioxide. The temperature in the reaction vessel is maintained between about 50° C. and about 100° C., more preferably about 65-75° C., most preferably about 70° C. Time and temperature can be traded off, higher temperatures typically reducing the time required for conversion of the hydroxide to the oxide. After a period at these elevated temperatures, on the order of about 1 hour or less and suitably about 0.5 hour, the cerium hydroxide is converted to cerium dioxide and the temperature of the reaction vessel is lowered to about 15-25° C. Subsequently, the cerium dioxide nanoparticles are concentrated, and the unreacted cerium and waste by-products such as ammonium nitrate are removed, most conveniently for example, by diafiltration.

In one aspect of the present invention, a method of making cerium dioxide nanoparticles includes providing an aqueous reaction mixture comprising cerous ion, hydroxide ion, a stabilizer, and an oxidant at temperature effective to generate small nuclei size, and achieve subsequent oxidation of cerous ion to ceric ion so that these particles can be grown into nanometric cerium dioxide. The reaction mixture is subjected to mechanical shearing, preferably by causing it to pass through a perforated screen, thereby forming a suspension of cerium dioxide nanoparticles having a mean hydrodynamic diameter in the range of about 2 nm to about 15 nm. While the particle diameter can be controlled within the range of 2 nm to 15 nm, preferably the cerium dioxide nanoparticles have a mean hydrodynamic diameter of about 10 nm or less, more preferably about 8 nm or less, most preferably, about 6 nm. Desirably, the nanoparticles comprise one or at most two primary crystallites per particle edge, each crystallite being on average 2.5 nm (approximately 5 unit cells). Thus, the resulting nanoparticle size frequency in substantially monodisperse, i.e., having a coefficient or variation (COV) less than 15%, where the COV is defined as the standard deviation divided by the mean.

Mechanical shearing includes the motion of fluids upon surfaces such as those of a rotor, which results in the generation of shear stress. Particularly, the laminar flux on a surface has a zero velocity, and shear stress occurs between rise zero-velocity surface and the higher-velocity flow away from the surface.

In one embodiment, the current invention employs a colloid mill, which is normally used for milling micro emulsions or colloids, as a chemical reactor to produce cerium dioxide nanoparticles. Examples of useful colloid mills include those described by Korstvedt, U.S. Pat. No. 6,745,961 and U.S. Pat. No. 6,505,626, the disclosures of which are incorporated herein by reference.

Figure 2A:
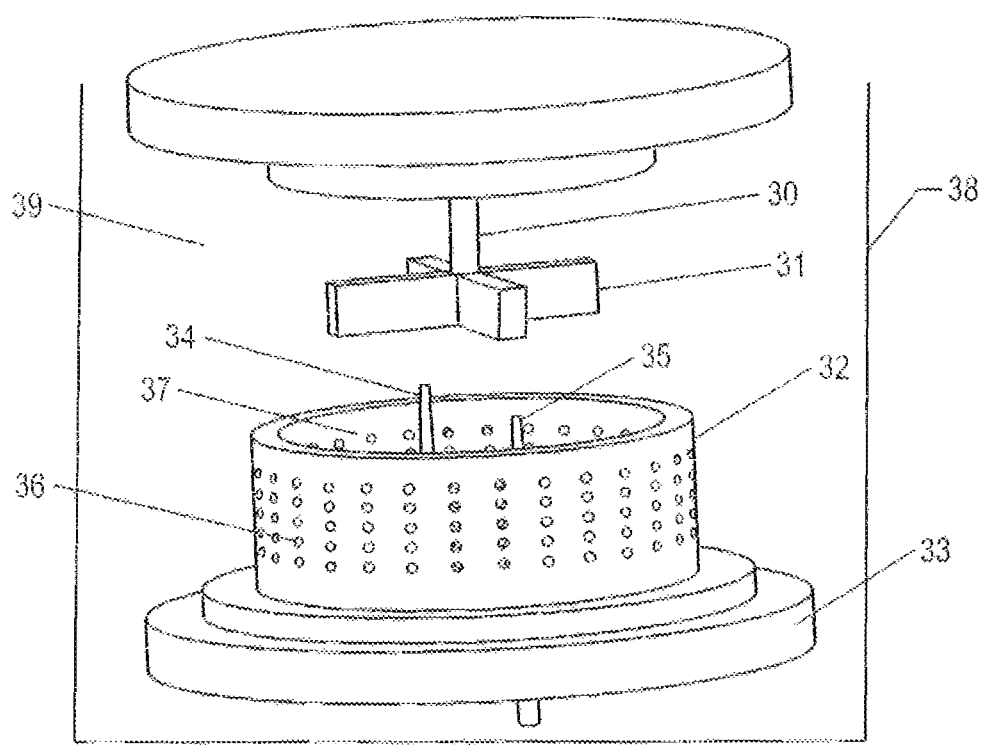
FIG. 2A shows a schematic exploded view of a colloid mill reactor that may be used in the invention.

A colloid mill, referred to as a Silverson mill, is depicted in U.S. Pat. No. 5,552,153, the disclosure of which is incorporated herein by reference, FIG. 2A schematically represents a colloid mill reactor, according to the present invention, that includes reactant inlet jets 54 and 35. The depicted colloid mill reactor has a rotating shaft 30 that is connected to a paddle blade rotor 31. The rotor is received in a cup-shaped screen stator 32, which has perforations 36 and encloses the reaction chamber 37. The stator is mounted on a housing 33, fitted with inlet jets 34 and 35. The inlet jets 34 and 35 extend into the housing 33 to the bottom of the perforated screen stator 32 into the reaction chamber 37. A plate (not shown) forms a top to the screen stator 32. The reactants are introduced via jets 34 and 35 into the reaction chamber. The colloidal mill reactor is enclosed in a reaction vessel 38, which may be submerged in a constant temperature bath (not shown).

During the stirring of the reaction mixture by rotation of the rotor shaft, the shaft rotation causes mechanical shearing of the reaction mixture between the flat faces (35) of the paddle rotor and the inner cylindrical surface of the stator. Cerium hydroxide particles initially formed in the reaction chamber are forced throughout the perforations in the screen and into the surrounding reaction vessel.

Various factors influence the mean diameter size and yield of the product cerium dioxide particles. Factors include reactant ratios, the rotor speed, the "gap" of the mill, which can be defined as the space between the rotor 31 and stator 32, and the size of the perforations 36 of the stator.

Typical rotor speeds are 5000 to 7500 rpm; however, at very high reagent concentrations (about 1 Molal or greater) rotor speeds of greater than 7500 rpm, such as 10,000 rpm, are preferred. It is desirable to keep the gap spacing as small as possible, typically about 1 mm to about 3 mm, consistent with a low back pressure in the colloid chamber, which allows a facile passage of the panicles through the perforations of the stator. In one embodiment, the perforations of the screen have a mean diameter of preferably about 0.5 mm to about 5 mm.

Figure 2B:
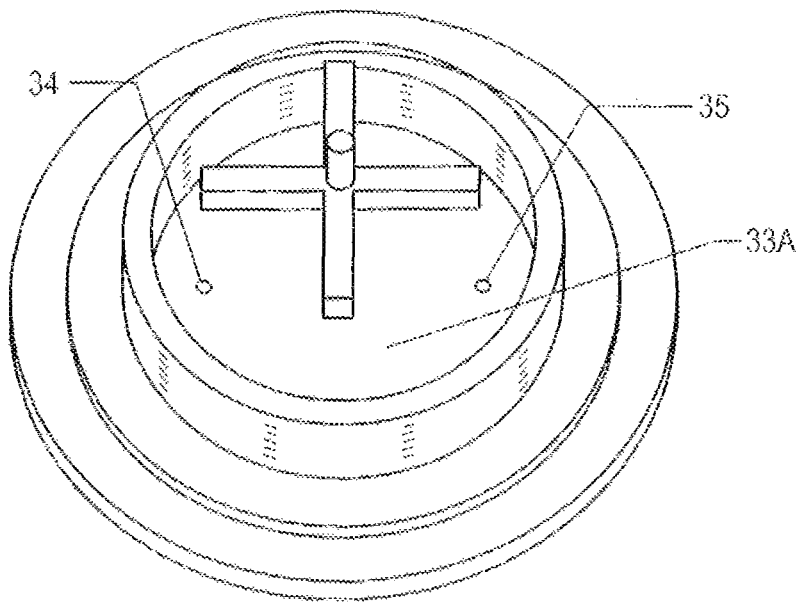
FIG. 2B shows a partial view of a colloid mill reactor that may be used in the invention.

FIG. 2B shows a partial view of the reactor, including the inlet jets 34 and 35 and the base of the reaction chamber 33A. In one embodiment, the inlet jets 34 and 33 are substantially flush with the bottom of the reaction chamber 33A.

Figure 2C:
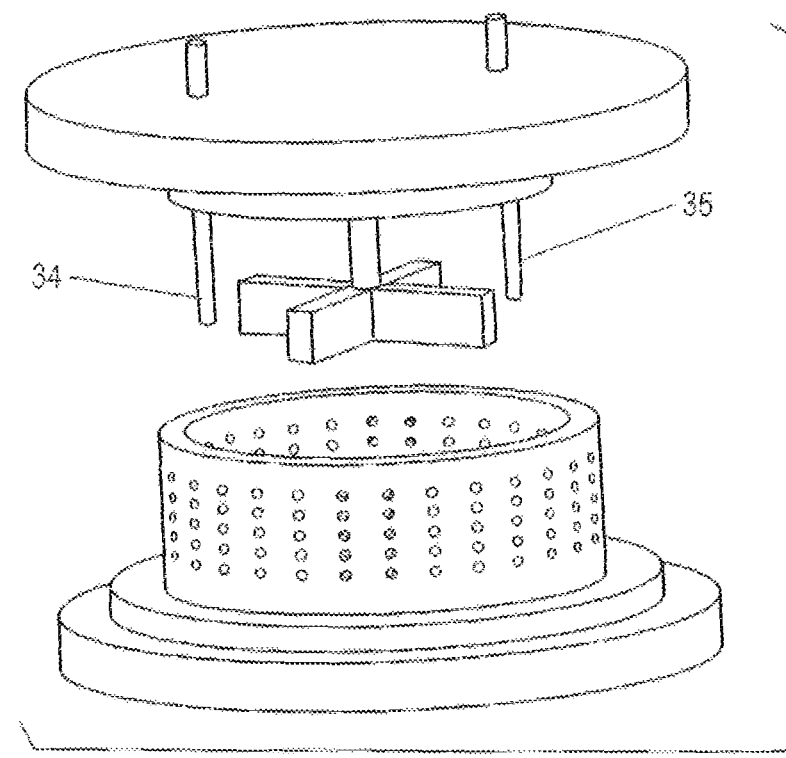
FIG. 2C shows a schematic exploded view of another type of colloid mill reactor that may be used in the invention.

FIG. 2C shows a schematic representation of a modification of the device described above, wherein the inlet jets, 34 and 35, extend into the reaction chamber from the top of the mill, instead of the bottom of the mill. Reactants are introduced into the reaction chamber by means of the reaction inlet(s) and the reaction mixture is stirred. Desirably, the reactants include an aqueous solution of cerous ion, for example cerous nitrate; an oxidant such as hydrogen peroxide or molecular oxygen; and a stabilizer, such as 2-[2-(2-methoxyethoxy)ethoxy] acetic acid. Typically, a two-electron oxidant, such as peroxide, is present, preferably in at least one-half the molar concentration of the cerium ion. The hydroxide ion concentration is preferably at least twice, more preferably three times, the molar cerium concentration.

Initially, the reaction chamber is maintained at a temperature sufficiently low to generate small cerous hydroxide nuclei size, which can be grown into nanometric cerium dioxide particles after a subsequent shift to higher temperatures, resulting in conversion of the cerous ion into the ceric ion state. Initially, the temperature is suitably about 25° C. or less, preferably about 20° C., more preferably about 15° C. In on embodiment, the temperature is about 10-20° C.

In one embodiment, a source of cerous ion, a nanoparticle stabilizer, and an oxidant is placed in the reactor and a source of hydroxide ion, such as ammonium hydroxide, is rapidly added with stirring, preferably over a time period of about 90 seconds or less, more preferable about 20 seconds or less, even more preferable about 15 seconds or less. In an alternative embodiment, a source of hydroxide ion and an oxidant is placed in the reactor, and a source of cerous ion is added over a period of about 15 seconds. In a third and preferred embodiment, the stabilizers are placed in the reaction vessel, and the cerous nitrate is simultaneously introduced into the reaction chamber with a separate jet of ammonium hydroxide at the optimum molar stoichiometric ratio of 2:1 or 3:1 OH:Ce.

Cerous ion reacts in the presence of hydroxide ion to form cerium hydroxide, which can be converted by heating to cerium dioxide. The temperature in the reaction vessel is maintained between about 50° C. and about 100° C., preferably about 65-90° C., more preferably about 80° C. After a period of time at these elevated temperatures, preferably about 1 hour or less, more preferably about 0.5 hour, the cerium hydroxide has been substantially converted to cerium dioxide, and the temperature of the reaction vessel is lowered to about 15-25° C. The time and temperature variables may be traded off higher temperatures generally requiring shorter reaction times. The suspension of cerium dioxide nanoparticles is concentrated, and the unreacted cerium and waste by-products such as ammonium nitrate are removed, which may be conveniently accomplished by diafiltration.

The nanoparticle stabilizer is a critical component of the reaction mixture. Desirably, the nanoparticle stabilizer is water soluble and forms weak bonds with cerium ion. $K_{BC}$ represents the binding constant of the nanoparticle stabilizer to cerium ion in water. Log $K_{BC}$ for the nitrate ion is 1 and for hydroxide ion is 14. Most desirably, log ($K_{BC}$) lies within this range, preferably towards the bottom of this range. Useful nanoparticle stabilizers include alkoxysubstituted carboxylic acids, α-hydroxyl carboxylic acids, pyruvic acid and small organic polyacids such as tartaric acid and citric acid. Examples of ethoxylated carboxylic acids include 2-(methoxy)ethoxy acetic acid and 2-[2-(2-methoxyethoxy)ethoxy] acetic acid (MEEA). Among the α-hydroxy carboxylic acids, examples include lactic acid, gluconic acid and 2-hydroxybutanoic acid. Polyacids include ethylenediaminetetraacetic acid (EDTA), tartaric acid, and citric acid. Combinations of compounds with large $K_{BC}$ such as EDTA with weak $K_{BC}$ stabilizers such as lactic acid are also useful at particular ratios. Large $K_{BC}$ stabilizers such as gluconic acid may be used at a low level or with weak $K_{BC}$ stabilizers such as lactic acid.

In one desirable embodiment, the nanoparticles stabilizer includes a compound of formula (Ia). In formula (Ia), R represents hydrogen, or a substituted or unsubstituted alkyl group or aromatic group such as, for example, a methyl group, an ethyl group or a phenyl group. More preferably, R represents a lower alkyl group such as a methyl group. $R^1$ represents hydrogen or a substituent group such as an alkyl group. In formula (Ia), n represents an integer of 0-5, preferably 2. In formula (Ia), Y represents H or a counterion, such as an alkali metal, for example $Na^+$ or $K^+$. The stabilizer binds to the nanoparticles and prevents agglomeration of the particles and the subsequent formation of large clumps of particles.

$$R-O-(CH_2CH_2O)_pCHR^1CO_2Y \quad (Ia)$$

In another embodiment, the nanoparticle stabilizer is represented by formula (Ib), wherein each $R^2$ independently represents a substituted or unsubstituted alkyl group or a substituted or unsubstituted aromatic group. X and Z independently represent H or a counterion such as Na⁺ or K⁺ and p is 1 or 2.

$$XO_2C(CR^2)_pCO_2Z \quad (Ib)$$

Useful nanoparticle stabilizers are also found among α-hydroxysubstituted carboxylic acids such as lactic acid or even the polyhydroxysubstituted acids such as gluconic acid.

Preferably, the nanoparticle stabilizer does not include the element sulfur, since sulfur-containing materials may be undesirable for certain applications. For example, if the cerium dioxide particles are included in a fuel additive composition, the use of a sulfur-containing stabilizer such as AOT may result in the undesirable emission of oxides of sulfur after combustion.

The size of the resulting cerium dioxide particles can be determined by dynamic light scattering, a measurement technique for the determination of a particle's hydrodynamic diameter. The hydrodynamic diameter (cf. B. J. Berne and R. Pecora "Dynamic Light Scattering: With Applications to Chemistry, Biology and Physics", John Wiley and Sons, NY 1976 and "Interactions of Photons and Neutrons with matter", S. H. Chen and M. Kotlarchyk, World Scientific Publishing, Singapore, 1997), which is slightly larger than the geometric diameter of the particle, includes both the native particle size and the solvation shell surrounding the particle. When a beam of light passes through a colloidal dispersion, the particles or droplets scatter some of the light in all directions. When the particles are very small compared with the wavelength of the light, the intensity of the scattered light is uniform in all directions (Rayleigh scattering). If the light is coherent and monochromatic as, for example, from a laser, it is possible to observe time-dependent fluctuations in the scattered intensity, using a suitable detector such as a photomultiplier capable of operating in photon counting mode. These fluctuations arise from the fact that the particles are small enough to undergo random thermal (Brownian) motion, and the distance between them is therefore constantly varying. Constructive and destructive interference of light scattered by neighboring particles within the illuminated zone gives rise to the intensity fluctuation at the detector plane, which, because it arises from particles motion, contains information about this motion. Analysis of the time dependence of the intensity fluctuation can therefore yield the diffusion coefficient of the particles from which, via the Stokes Einstein equation and the known viscosity of the medium, the hydrodynamic radius or diameter of the particles can be calculated.

In another aspect of the invention, a continuous process for producing small cerium dioxide nanoparticles, that is, particles having a mean diameter of less than about 10 nm, includes combining cerous ion, an oxidant, a nanoparticle stabilizer, and hydroxide ion within a continuous reactor, into which reactants and other ingredients are continuously introduced, and from which product is continuously removed. Continuous processes are described, for example, in Ozawa, et al., U.S. Pat. No. 6,897,270; Nickel, et al., U.S. Pat. No. 6,723,138; Campbell, et al., U.S. Pat. No. 6,627,720; Beck, U.S. Pat. No. 5,097,090, and Byrd, et al., U.S. Pat. No. 4,661,321; the disclosures of which are incorporated herein by reference.

A solvent such as water is often employed in the process. The solvent dissolves the reactants, and the flow of the solvent can be adjusted to control the process. Advantageously, mixers can be used to agitate and mix the reactants.

Any reactor that is capable of receiving a continuous flow of reactants and delivering a continuous flow of product can be employed. These reactors may include continuous-stirred-tank reactors, plug-flow reactors, and the like. The reactants required to carry out the nanoparticles synthesis are preferably charged to the reactor in streams; i.e., they are preferably introduced as liquids or solutions. The reactants can be charged in separate streams, or certain reactants can be combined before charging the reactor.

Reactants are introduced into the reaction chamber provided with a stirrer through one or more inlets. Typically, the reactants include an aqueous solution of cerous ion, for example, cerous nitrate; an oxidant such as hydrogen peroxide or molecular oxygen including ambient air; and a stabilizer, such as 2-[2-(2-methoxyethoxy)ethoxy] acetic acid, A two-election oxidant such as hydrogen peroxide is present, preferably in at least one-half the molar concentration of the cerium ion. Alternatively, molecular oxygen can be bubbled through the mixture. The hydroxide ion concentration is preferably at least twice the molar cerium concentration.

In one embodiment of the present invention, a method of forming small cerium dioxide nanoparticles includes the step of forming a first aqueous reactant stream that includes cerous ion, for example, as cerium (III) nitrate, and an oxidant. Suitable oxidants capable of oxidizing Ce(III) to Ce(IV) include, for example, hydrogen peroxide or molecular oxygen. Optionally, the first reactant stream also includes a nanoparticle stabilizer that binds to cerium dioxide nanoparticles, thereby preventing agglomeration of the particles. Examples of useful nanoparticle stabilizers were mentioned above.

The method further includes a step of forming a second aqueous reactant stream that includes a hydroxide ion source, for example, ammonium hydroxide or potassium hydroxide. Optionally, the second reactant stream further includes a stabilizer, examples of which were described previously. At least one of the first or second reactant streams, however, must contain a stabilizer.

The first and second reactant streams are combined to form a reaction stream, Initially, the temperature of the reaction stream is maintained sufficiently low to form small cerous hydroxide nuclei. Subsequently the temperature is raised so that oxidation of Ce(III) to Ce(IV) occurs in the presence of the oxidant, and the hydroxide is converted to the oxide, thereby producing a product stream that includes cerium dioxide. The temperature for conversion from the hydroxide to the oxide is preferably in the range of about 50-100° C., more preferably about 60-90° C. In one embodiment, the first and second reactant streams are combined at a temperature of about 10-20° C., and the temperature is subsequently increased to about 60-90° C.

Desirably, cerium dioxide nanoparticles in the product stream are concentrated, for example, by diafiltration techniques using one or more semi-porous membranes. In one embodiment, the product stream includes an aqueous suspension of cerium dioxide nanoparticles that is seduced to a conductivity of about 3 mS/cm or less by one or more semi-porous membranes.

Figure 3:
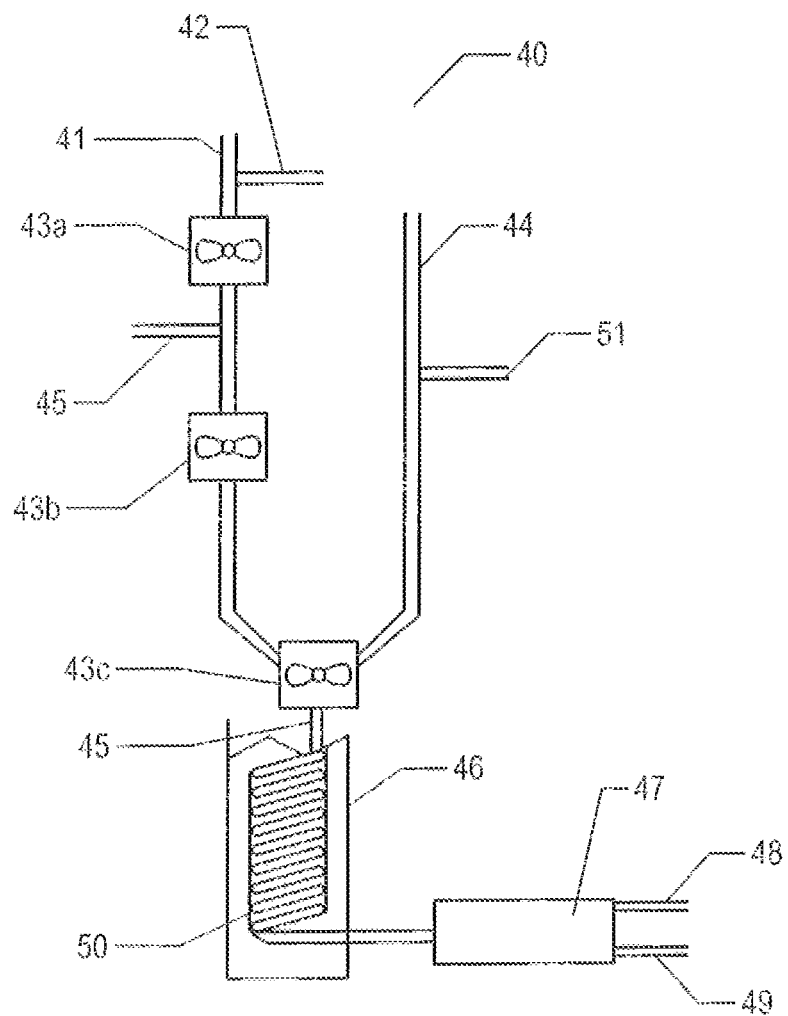
FIG. 3 shows a schematic representation of a continuous reactor for forming very small small cerium nanoparticles.

A schematic representation of a continuous reactor suitable for the practice of the invention is depicted in FIG. 3, The reactor 40 includes a first reactant stream 41 containing aqueous cerium nitrate. An oxidant such as hydrogen peroxide is added to the reactant stream by means of inlet 42, and the reactants are mixed by mixer 43a. To the resulting mixture is added stabilizer via inlet 45, followed by mixing by mixer 43b. The mixture from mixer 43b then enters mixer 43c, where ii is combined with a second reactant stream containing ammonium hydroxide from inlet 44. The first and second reactant streams are mixed using a mixer 43c to form a reaction stream that may be subjected to mechanical shearing by passing it through a perforated screen. In a further embodiment, mixer 43c comprises a colloid mill reactor, as described previously, that is provided with inlet ports for receiving the reactant streams and an outlet port 45. In a further embodiment, the temperature of the mixer 43c is maintained at a temperature in the range of about 10° C. to about 25° C.

The mixture from 43c enters a reactor tube 45 that is contained in a constant temperature bath 46 that maintains tube 45 at a temperature of about 60-90° C. Cerium nanoparticles are formed in the reactor tube 45, which may include a coil 50. The product stream then enters one or more diafiltration units 47, wherein the cerium nanoparticles are concentrated using one or more semi-porous membranes. One or more diafiltration units may be connected in series to achieve a single pass concentration of product or the units may placed in parallel for very high volumetric throughput. The diafiltration units may be disposed both in series and parallel to achieve both high volume and rapid throughput. Concentrated cerium nanoparticles exit the diafiltration unit via exit port 49, and excess reactants and water are removed from the diafiltration unit 47 via exit port 48. In an alternative embodiment, stabilizer may be added to the second reactant stream via port 51 rather than to the first reactant stream via port 45.

In one embodiment of the invention, the product stream of concentrated cerium nanoparticles exiting the diafiltration unit 47 is combined with a stream that includes a nonpolar solvent and at least one surfactant, wherein the surfactant is chosen so that a reverse micelle is formed in the emulsion, as described below.

The use of a continuous process for producing cerium dioxide nanoparticles allows better control of the production of particle nuclei and their growth relative to that afforded by batch reactors. The nuclei size can be controlled by the initial reagent concentration, temperature, and the ratio of nanoparticle stabilizer to reagent concentrations, Small nuclei are favored by low temperatures, less than about 20° C., and high ratios of nanoparticle stabilizer to reagent concentrations. In this way, very small cerium dioxide nanoparticles having a mean hydrodynamic diameter of leas than about 10 nm can be produced in an economical manner.

It may be possible to use some of the aqueous precipitation medium in which cerium dioxide particles are typically formed to subsequently enhance the activity of the nanoparticles. When a mixture, including cerium nanoparticles and a small amount of water, undergoes combustion in the presence of air and foci in a diesel engine, flame temperatures may reach levels as high as 900° C. (1652° F.). At these high temperatures, reduction of cerium and production of oxygen according to equation 1 is very efficient. Additionally, at these elevated temperatures superheated steam can be generated from the water. This not only will increase the compression ratio, resulting in higher engine efficiency, but will also result in the separation of the fuel wave front into many, very small, high surface area droplets, this allows better mixing of the air-fuel regions, which enables the cerium dioxide particles to provide oxygen to the fuel more readily, resulting in more complete fuel combustion. This in turn increases engine performance while simultaneously reducing particulate matter emissions. If sufficient water is present, the combustion temperature will be lowered somewhat, and may also reduce levels of nitrogen oxide ($NO_x$) production, which is greatest at higher temperatures. However at sufficiently high levels of water, the combustion temperature can be lowered to the point at which engine power is reduced this phenomenon can be offset by replacing some of the water in the aqueous phase with a water-soluble cetane improver such as hydrogen peroxide or t-butyl hydroperoxide. Thus, it would be beneficial to provide a homogeneous mixture of stable nanoparticles of cerium dioxide and water in a nonpolar medium such as, for example, diesel fuel.

The invention provides a method for formulating a homogeneous mixture that includes cerium dioxide nanoparticles, a nanoparticle stabilizer, a surfactant, water, and a nonpolar solvent. Preferably, the nanoparticles have a mean diameter of less than about 10 nm, more preferably less than about 8 nm, most preferably about 6 nm.

As described above, cerium dioxide nanoparticles can be prepared by various procedures. Typical synthetic routes utilize water as a solvent and yield an aqueous mixture of nanoparticles and one or more salts. For example, cerium dioxide particles can be prepared by reacting the hydrate of cerium (III) nitrate with hydroxide ion from, for example, aqueous ammonium hydroxide, thereby forming cerium (III) hydroxide, as shown in equation (2a). Cerium hydroxide can be oxidized to cerium (IV) dioxide with an oxidant such as hydrogen peroxide, as shown in equation (2b). The analogous tris hydroxide stoichiometry is shown in equations (3a) and (3b).

$$Ce(NO_3)_3(6H_2O)+2NH_4OH \rightarrow Ce(OH)_2NO_3+ 2NH_4NO_3+6H_2O \quad (2a)$$

$$2Ce(OH)_2NO_3+H_2O_2 \rightarrow 2CeO_2+2HNO_3+2H_2O \quad (2b)$$

$$Ce(NO_3)_3(6H_2O)+3NH_4OH \rightarrow Ce(OH)_3+3NH_4NO_3+ 6H_2O \quad (3a)$$

$$2Ce(OH)_3+H_2O_2 \rightarrow 2CeO_2+4H_2O \quad (3b)$$

Complexes formed with very high base levels, e.g. 5:1 OH:Ce, also provide a route to cerium dioxide In some cases, especially where ammonium hydroxide is not present in excess relative to cerous ion, the species $Ce(OH)_2(NO_3)$ or $(NH_4)_2Ce(NO_3)_5$ may initially be present, subsequently undergoing oxidation to cerium dioxide.

The cerium dioxide particles are formed in an aqueous environment and combined with one or more nanoparticle stabilizers. Desirably, the cerium dioxide nanoparticles are either formed in the presence of the stabilizer(s), or a stabilizer(s) is added shortly after their formation. Useful nanoparticle stabilizers include alkoxysubstituted carboxylic acids, α-hydroxyl carboxylic acids, pyruvic acid, and small organic polycarboxylic acids. Examples of alkoxysubstituted carboxylic acids include 2-(methoxy)ethoxy acetic acid and 2-[2-(2-methoxyethoxy)ethoxy] acetic acid (MEEA). Examples of α-hydroxy carboxylic acids include lactic acid; gluconic acid and 2-hydroxybutanoic acid. Polycarboxylic acids include ethylenediaminetetraacetic acid (EDTA), tartaric acid, and citric acid. In desirable embodiments, the nanoparticle stabilizer includes a compound of formula (Ia) or formula (Ib), as described above.

The reaction mixture includes, in addition to cerium dioxide nanoparticles, one or more salts, for example, ammonium nitrate and unreacted cerium nitrate. The stabilized panicles cars be separated from these materials and salts by washing with 18 Mohm water in an ultrafiltration or diafiltration apparatus. Low ionic strength (<3 mS/cm) is highly desirable for the formation and stabilization of retained water in a micellar state. The washed, stabilized cerium dioxide nanoparticles may be concentrated, if desired, using a semi-porous membrane, for example, to form an aqueous concentrate of the nanoparticles. The particles may be concentrated by other means as well, for example, by centrifugation.

In one preferred embodiment, the cerium dioxide nanoparticles are concentrated by diafiltration. The diafiltration technique utilizes ultrafiltration membranes, which can be used to completely remove, replace, or lower the concentration of salts in the nanoparticle-containing mixture. The process selectively utilizes semi-permeable (semi-porous) membrane filters to separate the components of the reaction mixture on the basis of their molecular size. Thus, a suitable ultrafiltration membrane would be sufficiently porous so as to retain the majority of the formed nanoparticles, while allowing smaller molecules such as salts and water to pass through the membrane. In this way, the nanoparticles and the associated bound stabilizer can be concentrated. The materials retained by the filter, including the stabilized nanoparticles, are referred to as the concentrate or interstate, the discarded salts and unreacted materials as the filtrate.

Pressure may be applied to the mixture to accelerate the rate at which small molecules passes through the membrane (flow rate) and to speed the concentration process, Other means of increasing the flow rate include using a large membrane having a high surface area, and increasing the pore size of the membrane, but without an unacceptable loss of nanoparticles.

In one embodiment, the membrane is selected so that the average pore size of the membrane is about 30% or less, 20% or less, 10% or less, or oven 5% or less than that, of the mean diameter of the nanoparticles. However, the pore diameter must be sufficient to allow passage of water and salt molecules. For example, ammonium nitrate and unreacted cerium nitrate should be completely or partially removed from the reaction mixture. In one preferred embodiment, the average membrane pore size is sufficiently small to retain particles of 3 nm diameter or greater in the retentate. This would correspond to a protein size of approximately 3 kilodaltons.

Desirably, the concentrate includes stabilized nanoparticles and residue water. In one embodiment, the concentration of cerium dioxide nanoparticles is preferably greater than about 0.5 molal, more preferably greater than about 1.0 molal even more preferably greater than about 2.0 molal.

Once the concentrate is formed, it is combined with one or more surfactants and a nonpolar solvent to form a homogeneous mixture. The surfactant is chosen so that a reverse micelle consisting of an aqueous, stabilized cerium dioxide nanoparticles dispersed in a nonpolar medium is formed. Reverse micellar solutions consisting of panicles in an aqueous environment dispersed m a nonpolar solvent, have been described previously in, for example, Ying, et al., in U.S. Pat. No. 6,869,584 and U.S. Patent Appl. Publ. No. 2005/0152832, the disclosures of which are incorporated herein by reference.

Depending upon the relative sizes of the cerium dioxide nanoparticles and the reverse micelle particles, the former may be incorporated into the structure of the latter to varying extents. In one embodiment, the stabilized cerium dioxide nanoparticles are added, with mixing, to a solution of the surfactant and a co-surfactant and a nonpolar solvent at a temperature in the range of about 25° C. to about 0° C. Suitable nonpolar solvents include, for example, hydrocarbons containing about 6 to 20 carbon atoms, for example, pentane, heptane, octane, decane and toluene, and hydrocarbon fuels such as gasoline, biodiesel, and diesel fuels.

Useful surfactants include nonylphenyl ethoxylates having the formula, $C_9H_{19}C_6H_4(OCH_2CH_2)_nOH$, wherein n is 4-6. Other surfactants that contain both an ether group and an alcohol group includes compounds of formula (Ic), in which $R^3$ represents a substituted or unsubstituted alkyl group, and m is an integer of 1-8.

$$R^3-(OCH_2CH_2)_m-OH \qquad (Ic)$$

In certain embodiments, carboxylate surfactants such as the salts of stearic acid, palmitic acid, and oleic acid may be useful as surfactants.

Another type of useful surfactant is represented by formula (Ib), wherein each $R^2$ independently represents a substituted or unsubstituted alkyl group or a substituted or unsubstituted aromatic group, X and Z independently represent H or a counterion such as $Na^+$, or $K^+$, and p is 1 or 2.

$$XO_2C(CR^2)_pCO_2Z \qquad (Ib)$$

In another embodiment, the reverse-micelle rooming agent includes an anionic surfactant and a nonionic co-surfactant. Useful co-surfactants include aliphatic alcohols, for example, pentanol and hexanol and their geometric isomers.

Formulating cerium dioxide nanoparticle dispersions using a reverse micelle formation allows the aqueous nanoparticle stabilizing agent(s) to be independently optimized from that of the surfactant(s).

A desirable reverse-micellar composition is effective for lowering the cold pour cloud point of diesel fuel, that is, the temperature at which wax crystals begin to form and the diesel fuel begins to gel. For a discussion of the cold pour cloud point, see Longer et al., U.S. Pat. No. 6,368,366 and U.S. Pat. No. 6,383,237, the disclosures of which are incorporated herein by reference.

A desirable reverse-micellar composition is extremely stable and capable of very high dilution ratios; a dilution of 500:1 fuel:micellar composition or greater is, highly advantageous. To optimize the stability of the reverse-micellar composition, the cerium dioxide nanoparticle concentrate preferably includes high resistivity water, that is, wafer having a resistivity of about 1-18 mega ohm per cm, preferably about 18 mega ohm per cm. Pure water has a resistivity of 18.3 mega ohm per cm.

Resistivity is the reciprocal of conductivity, which is the ability of a material to conduct electric current. Conductivity instruments can measure conductivity by including two plates that are placed in the sample, applying a potential across the plates (normally a sine wave voltage), and measuring the current Conductivity (G), the inverse of resistivity (R), is determined from the voltage and current values according to Ohm's law, $G=1/R=I/E$, where I is the current in amps and E is the voltage in volts. Since the charge on ions in solution facilitates the conductance of electrical current the conductivity of a solution is proportional to its ion concentration. The basic unit of conductivity is the siemens (S), or milli-Siemens (mS). Since cell geometry affects conductivity values, standardized measurements are expressed in specific conductivity units (mS/cm) to compensate for variations in electrode dimensions.

In an optimal micellar composition, it is desirable that very few ions be present in the cerium dioxide concentrate to conduct electricity. This situation can be achieved by concentrating the cerium dioxide particles through diafiltration to a conductivity level of less than 5 mS/cm preferably to 3 mS/cm or less.

The present invention is further directed to a method for formulating a homogeneous mixture Including cerium dioxide nanoparticles, at least one nanoparticle stabilizer and at least one surfactant, water, and a nonpolar solvent. A first step provides an aqueous mixture including stabilized cerium dioxide nanoparticles, wherein molecules of the nanoparticle stabilizer are closely associated with the nanoparticles. A second step includes concentrating the stabilized cerium dioxide nanoparticles while minimizing the ionic strength of the suspension to form an aqueous concentrate that is relatively free of anions and cations. A third step includes combining the concentrate with a nonpolar solvent, containing a surfactant, thereby forming a substantially homogeneous mixture that is a thermodynamically stable, multicomponent, single phase, reverse ("water in oil") micellar solution.

The substantially homogenous mixture contains water at a level of preferably about 0.5 wt. % to about 20 wt. %, more preferably, about 5 wt. % to about 15 wt. % The cerium dioxide nanoparticles have a mean hydrodynamic diameter of preferable less than about 10 nm, more preferably less than about 8 nm, most preferably about 6 nm. Desirably, the cerium dioxide nanoparticles have a primary crystallite size of about 2.5 nm±0.5 nm and comprise one or at most two crystallites per particle edge length.

The aqueous mixture is advantageously formed in a colloid mill reactor, and the nanoparticle stabilizer may comprise an ionic surfactant, preferably a compound that includes a carboxylic acid group and an ether group. The nanoparticle stabilizer may comprise a surfactant of formula (Ia),

$$R\text{—}O\text{—}(CH_2CH_2O)_n CHR^1 CO_2 Y \quad (Ia)$$

wherein:
R represents hydrogen or a substituted or unsubstituted alkyl group or a substituted or unsubstituted aromatic group;
$R^1$ represents hydrogen or an alkyl group;
Y represents H or a counterion; and
n is 0-5.
Preferably, R represents a substituted or unsubstituted alkyl group, $R^1$ represents hydrogen, Y represents hydrogen, and n is 2.

Another suitable nanoparticle stabilizer comprises a compound of formula (Ib),

$$XO_2C(CR^2)_p CO_2 Z \quad (Ib)$$

wherein:
each $R^2$ independently represents hydrogen, a substituted or unsubstituted alkyl group or a substituted or unsubstituted aromatic group;
X and Z independently represent H or a counterion; and
p is 1 or 2.
Other useful nanoparticle stabilizers are included in the group consisting of lactic acid, gluconic acid enantiomers, EDTA, tartaric acid, citric acid, and combinations thereof.

The surfactant may also comprise a nonionic surfactant, preferable a compound comprising an alcohol group and an ether group, in particular, a compound of formula (Ic),

$$R^3\text{—}(OCH_2CH_2)_m\text{—}OH \quad (Ic)$$

wherein:
$R^3$ represents a substituted or unsubstituted alkyl group; and m is an integer from 1 to 8.
The nonionic surfactant may also comprise a compound of formula (Id),

$$R^3\text{-}\phi\text{-}(OCH_2CH_2)_m\text{—}OH \quad (Id)$$

wherein:
$R^3$ represents a substituted or unsubstituted alkyl group; and
Φ is an aromatic group
m is an integer from 4 to 6.
The surfactant may also comprise an anionic surfactant, preferably a compound containing a sulfonate group or a phosphonate group. A useful anionic surfactant is sodium bis(2-ethyl-1-hexyl)sulfosuccinate (AOT).

The aqueous reaction mixture may further include a co-surfactant, preferably an alcohol.

Concentrating the aqueous mixture is preferably carried out using diafiltration, which results in the reduction in conductivity of said concentrated aqueous mixture to about 3 mS/cm or less.

The nonpolar solvent included in the substantially homogeneous solution is advantageously selected from among hydrocarbons containing about 6-20 carbon atoms, for example, octane, decane, toluene, diesel fuel, biodiesel, and mixtures thereof. When used as a fuel additive, one part of the homogeneous mixture is with at least about 100 parts of the bad.

Further in accordance with the present invention is a method for preparing cerium dioxide nanoparticles comprising a core and a shell, wherein the shell comprises a material selected from the group consisting of a transition metal, a lanthanide, a sulfur-containing compound that may include a mercaptide group, and combinations thereof. Preferably, the core comprises about 90% or less of the nanoparticle by volume, and the shell comprises about 5% or more of the nanoparticle by volume. The shell comprises lattice sites, and up to about 30% of the lattice sites include a material selected from the group consisting of a transition metal, a lanthanide, a sulfur-containing compound, and combinations thereof.

The transition metal is preferably selected from the group consisting of Fe, Mn, Cr, Ni, W, Co, V, Cu, Mo, and Zr, or from the lanthanide series, and combinations thereof. Desirably, the transition metal is capable of binding to iron. It is also desirable that the transition metal be capable of reacting with an oxide of sulfur. In a further embodiment, the transition metal is associated with at least one ligand that comprises sulfur.

A composition comprising aqueously suspended cerium dioxide nanoparticles that comprise a core and a shelf wherein the shell includes at least one transition metal may be subsequently solvent shifted into a non polar medium in which the particles are essentially water free and are incorporate into a lubrication oil. The nanoparticles in the oil act as an adjuvant to further reduce friction of contacting moving engine parts.

It would be beneficial to form a ceramic oxide coating on the surface of diesel engine cylinders in situ. The potential benefits of the coating include added protection of the engine from thermal stress; for example, $CeO_2$ melts at 2600° C., whereas cast iron, a common material used in the manufacture of diesel engines, melts at about 1200-1450° C. Even 5 nm ceria particles have demonstrated the ability to protect steel from oxidation for 24 hours at 1000° C., so the phenomenon of size dependent melting would not be expected to lower the melting point of the cerium dioxide nanoparticles of the invention below the combustion temperatures encountered in the engine. See, for example, Patil et al., *Journal of Nanoparticle Research*, vol. 4, pp 433-433 (2002). An engine so protected may be able to operate at higher temperatures and compression ratios, resulting in greater thermodynamic efficiency. A diesel engine having cylinder walls coated with cerium dioxide would be resistant to further oxidation ($CeO_2$ being already fully oxidized), thereby preventing the engine from "rusting." This is important because certain additives used to reduce carbon emissions or improve fuel economy such as, for example, the oxygenates MTBE, ethanol and other cetane improvers such as peroxides, also increase corrosion when introduced into the combustion chamber, which may result in the formation of rust and degradation of the engine lifetime and performance. The coating should not be so thick as to impede the cooling of the engine walls by the water recirculation cooling system. In one embodiment, the current invention provides cerium dioxide nanoparticles having a mean hydrodynamic diameter of less than about 10 nm, preferably less than about 8 nm, more preferably 6 nm or even less, that are useful as a fuel additive for diesel engines. The surfaces of the cerium dioxide nanoparticles may be modified to facilitate their binding to an iron surface, and desirably would, when included in a fuel additive composition, rapidly form a ceramic oxide coating on the surface of diesel engine cylinders.

In one embodiment, a transition or lanthanide metal having a binding affinity for iron is incorporated onto the surface of the cerium dioxide nanoparticles. Examples of iron surfaces include those that exist in many internal parts of engines. Suitable transition metals include Mn, Fe, Mi, Cr, W, Co, V, Cu, and Zr.

The transition or lanthanide metal ion, which is incorporated into the cerium dioxide nanoparticles by occupying a cerium ion lattice site in the crystal, may be introduced as a dopant during the latter stages of the precipitation of cerium dioxide. The dopant can be added in combination with cerous ion, for example, in a single jet manner in which both cerous ion and transition metal ion are introduced together into a reactor containing ammonium hydroxide. Alternatively, the dopant and cerous ion can be added together with the simultaneous addition of hydroxide ion. The doped particles can also be formed in a double jet reaction of cerous ion with dissolved transition metal ion titrated against an ammonium hydroxide steam simultaneously introduced by a second jet. In any event, if is understood that sufficient nanoparticle stabilizer is present to prevent agglomeration of the nascent particles.

In a further embodiment, cerium dioxide nanoparticles are prepared having a core-shell structure. The core of the particle preferably includes at least about 75% more preferably, about 95% or greater of the bulk particle, and may be optionally doped with a metal. The shell, including the outer portion and surface of the particle, preferably comprises about 25% or less, more preferably about 10% or less, most preferably about 5% or less, of the particle, and includes a transition or lanthanide metal. Up to about 30% of the $CE^{+4}$ lattice sites of the shell may occupied by one or more transition or lanthanide metals. Suitable transition metals include Mn, Fe, Ni, Cr, W, Co, V, Cu, Zr, and Mo, and combinations thereof.

In a further embodiment, the cerium dioxide nanoparticles have a core-shell structure, wherein the shell includes at least one compound comprising sulfur Preferably, the sulfur is present so that it is capable of forming a bond with iron. When used as a fuel additive for a diesel engine, the sulfur contained in the shell of the cerium dioxide particles binds to the iron surface of the combustion chamber of the engine, thereby accelerating the deposition of cerium dioxide on the surface of the combustion chamber. Suitable sulfur compounds include ZnS, MnS, FeS, $Fe_2S_3$, CoS, NiS, and CuS. The sulfur may be past of a transition metal ligand, wherein the metal and its associated ligand are incorporated into the surface of the cerium dioxide nanoparticles. For example, ligands that include a mercaptide group can form sulfur-iron bonds.

Sulfur can be incorporated into the cerium dioxide nanoparticles during the aqueous precipitation of $CeO_2$, for example, by incorporating with the cerium nitrate hexahydrate reactant the appropriate water soluble transition metal salt (nitrate, sulfate or chloride), together with a labile source of sulfur such as thiosulfate (alternatively, the thiosulfate salt of a transition metal may be used). During the thermal conversion of the cerium hydroxide to the oxide at elevated temperatures, for example, about 70-90° C., the corresponding transition metal sulfide will also form.

In another embodiment, a transition metal Is incorporated into the surface of the cerium dioxide nanoparticles. Desirably, this metal is chosen so that it is capable of reacting with sulfur and forming a bond to sulfur. The transition metal is present in the reaction mixture during the shell format Ion of the $CeO_2$ precursor (cerium hydroxide), Suitable metals include Mn and Fe as well as W, Co, V, Cm and Mo. Typical aqueous soluble transition metal suits include sulfates, nitrates, and chlorides of these metals.

When used as a fuel additive, the transition metal-containing nanoparticles can bind sulfur that may be present in the fuel. Iron, for example, can react with sulfur dioxide to form $Fe_2S_3$. This reduces the level of reactive sulfur, for example, sulfur oxides, present in gases emitted from the fuel combustion chamber. Removal of sulfur after feel combustion is very desirable, since many vehicle exhaust systems include particulate traps containing a platinum catalyst that can be poisoned by sulfur. Hence removal of sulfur before it reaches the catalyst can prolong the life of the catalyst Useful metals for the reduction of sulfur dioxide are also described by Yamashita, et al., U.S. Pat. No. 5,910,466, the disclosure of which is incorporated herein by reference.

It is known in the art that small particles can be made within the Isolated phase of an emulsion, which is a stable mixture of at least two immiscible liquids. Although immiscible liquids tend to separate into two distinct phases, an emulsion can be stabilized by the addition of a surfactant that functions to reduce surface tension between the liquid phases. An emulsion comprises a continuous phase and a disperse phase that is stabilized by a surfactant. A water-in-oil (w/o) emulsion having a disperse aqueous phase and an organic continuous phase, typically comprising a hydrocarbon, is often referred to as a "reverse-micellar composition."

Further in accordance with the invention, a reverse-micellar composition comprises a disperse phase comprising a cerium (IV) nanoparticle-containing aqueous composition, together with a continuous phase comprising a hydrocarbon liquid and at least one surfactant. A fuel additive composition of the invention comprises a reverse-micellar composition whose aqueous disperse phase includes in-situ-formed nanoparticles comprising a cerium (IV) oxidic compound, and whose continuous phase includes a hydrocarbon liquid and a surfactant/stabilizer mixture. The surfactant/stabilizer mixture is effective to restrict the size of the nanoparticles thus formed, preventing their agglomeration and enhancing the yield of the nanoparticles.

In another embodiment, a reverse-micellar composition comprises: an aqueous disperse phase that includes a free radical initiator and a continuous phase that includes a hydrocarbon liquid and at least one surfactant. Optionally, the reverse-micellar composition may include cerium-containing nanoparticles.

In a further embodiment, a fuel additive composition comprises: a continuous phase comprising a hydrocarbon liquid, a surfactant, and optionally a cosurfactant; and forming a reverse-micellar composition comprising an aqueous disperse phase that includes a cetane improver effective for improving engine power during combustion of the fuel. The fuel additive composition optionally further comprises cerium-containing nanoparticles, which may be included in either a separate dispersion or a separate reverse-micellar composition.

In one embodiment of the present invention, a water-in-oil emulsion has a small micellar disperse size, and the particulate material is formed within the aqueous disperse phase. The appropriate choice of surfactants and reaction conditions provides for the formation of stable emulsions, the control of particle size distribution and growth, and the prevention of particle agglomeration. The oil phase preferably comprises a hydrocarbon, which may further include oxygen-containing compounds. In the micelle, the disperse aqueous phase is encompassed by a surfactant boundary that isolates and stabilizes the aqueous phase from the organic continuous phase.

A surfactant included in the emulsion preferably in the continuous phase to stabilize the reverse micelles can be an ionic surfactant, a non-ionic surfactant, or a combination thereof. Suitable surfactants include, for example, nonylphenyl ethoxylates, monoalkyl and dialkyl carboxylates, and combinations thereof.

The difficulties of using two distinct reverse micelles for the cerium-containing reactant and a precipitating agent such as ammonium hydroxide are avoided by the present invention, which provides for the combination of both reactants into a single reverse micelle using a homogeneous precipitation method, wherein a first reactant is homogeneously mixed with a precursor of a second reactant. A suitable first reactant is a $Ce^{+4}$-containing compound, which may be obtained by oxidation using $H_2O_2$ for example, of a $Ce^{-3}$-containing compound such as, for example, $Ce(NO_3)_3.6\ H_2O$.

A suitable second reactant is ammonia, $Nh_3$, which can be obtained by the heat- and/or light activated hydrolysis of hexamethylenetetramine, $C_6H_{12}N_4$, (HMT), as shown in equation (4):

$$C_6H_{12}N_4 + 12H_2O \rightarrow 4NH_3 + 6CH_2O \tag{4}$$
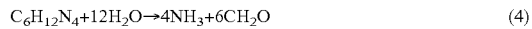

The homogeneous precipitation of cerium dioxide using HMT has been reported by Zhang, F., Chan Siu-Wai et al., *Applied Physics,* 80, 1 (2002), pp 127-129, and in the previously discussed Chan, U.S. Patent Appl. Publ. No. 2005/0031517. In the absence of a stabilizer, the size of the cerium dioxide panicles produced by the procedure described in these references continues to increase with time. Furthermore, the procedure utilizes very dilute solutions and Song reaction times, and produces low product yield.

In an example of the process of the present invention, which beneficially combines reverse micelle with homogeneous precipitation techniques, $Ce(NO_3)_3$ ($6H_2O$) is combined with $H_2O_2$ to generate a $Ce^{+4}$-containing solution. Preferably, the solution further includes a stabilizer for controlling the size of the cerium-containing nanoparticles. A preferred stabilizer is 2-[2-(2-methoxyethoxy)ethoxy] acetic acid (MEEA). The resulting solution is added to a cold HMT solution at a temperature sufficiently low, less than about 15° C., to inhibit premature reaction. The resulting mixture is then slowly added to an oil phase comprising a surfactant and an organic solvent such as, for example, toluene, octane, decane, gasoline, D2 diesel fuel, ULSD, biodiesel, or combinations thereof. The new mixture is heated to a temperature just sufficient to effect substantially complete formation of the Ce-containing nanoparticles. The precise temperature required depends on the choice of reverse-micelle surfactant and the concentration of the first reactant and second reactant precursor but is desirably maintained below about 47° C. The reverse-micelle surfactant may also serve to stabilize the Ce-containing nanoparticles. Alternatively, the aqueous $Ce^{+4}$-HMT mixture may be premixed with another surfactant different from that used to form the reverse-micellar composition. The aqueous composition may optionally further include a cetane improving agent generally recognized to be a free radical forming species at elevated temperatures.

Depending on the reaction conditions, the individual micelles may be small enough to encompass a single cerium containing nanoparticle or large enough to contain a plurality of the nanoparticles. Thus, the micelles have a diameter of preferably about 5 nm to about 50 nm, more preferably about 20 nm. The cerium-containing nanoparticles have a diameter of preferably about 1 nm to about 15 nm, more preferably about 2 nm to about 10 nm.

The $CH_2O$ generated in the aqueous phase by the hydrolysis of HMT may be utilized in a subsequent fuel combustion process. Alternatively, if the reverse micelle contains some cross-linkable groups, the $CH_2O$ can effect cross-linking within the micelle, strengthening it or increasing its heat-resistance.

A fuel additive emulsion formed by the reverse micelle process of the present invention includes water used in the preparation of the cerium-containing nanoparticles Excess water introduced into a fuel with the cerium-containing emulsion can lead to a loss of engine power. To overcome this problem and thereby improve fuel performance, water can be removed from the cerium-containing aqueous phase and replaced by a cetane improver. Water removed by, for example, diafiltration may be replaced by a water-soluble cetane improving compound. Compounds suitable for the purpose include, for example, 30-50 wt. % aqueous $H_2O_2$, t-butyl hydroperoxide nitromethane, and low molecular weight alkyl ethers such as dimethyl ether and diethyl ether.

Free radical initiators such as, for example, $H_2O_2$ are known to be effective cetane improvers for diesel fuel, resulting in reductions in soot and hydrocarbon emission. Cetane number is an indicator of the ignition delay time after injection of fuel into the combustion chamber; alternatively, it can be regarded as being related to the inverse of the ignition time, i.e., the time between the injection of the diesel fuel into the compressed superheated air in the combustion chamber and the actual ignition of the injected fuel stream. The higher the cetane number, the more completely combusted the fuel and the less soot production, as ignition delay gives rise to the formation of soot. An additional consideration is the desire for this ignition to occur as closely as possible in time to when the piston reaches top-dead-center (TDC), since too short an ignition time would result in the combusted gases working against the compressive stroke of the piston. For 12-liter diesel and smaller engines, fuel injection usually occurs at a crank angle of 5 or 6 degrees before TDC. Thus, cetane improvement would have a very small effect on the crank angle and minimal adverse effect on engine power. On the other hand, substantial cetane improvement with diesel locomotive engines, which have a 25 degree crank angle, would be problematic for engine power without prior adjustment of the crank angle.

Utilization of a free radical mechanism for enhanced combustion efficiency is a very attractive alternative to simply increasing the $O_2$ stoichiometry in the combustion chamber, since free radical chemistry involving O atoms or OH species is roughly two orders of magnitude faster than direct oxidation by $O_2$ as represented in equation (5):

$$C_{14}H_{30} 22O_2 \rightarrow 15H_2O + 14CO_2 \tag{5}$$

This is partly a consequence of the need to initially rupture a O=O bond (bond disassociation energy delta H of 119.2 Kcal/mole) and the high reactivity of OH radicals, which are one of the most chemically reactive species that can be generated (on an electromotive force scale or free energy scale), just slightly less reactive than fluorine radicals.

Oxidation of hydrocarbons and soot by free radical chemical chemistry, on the other hand, can involve breaking a relatively weak O—O single bond (delta H=47 kcal/mole for hydrogen peroxide) and then proceed via direct C—H bond scission to give water and "hot," i.e., chemically reactive, hydrocarbon radical, as shown in equation (7):

$$H_2O_2 \rightarrow 2\ ^-OH \tag{6}$$

$$H_3C-C_{13}H_{27}+^-OH \rightarrow H_2O+^+CH_2-C_{13}H_{27} \tag{7}$$

$$H_2O_2 \rightarrow H_2O + \tfrac{1}{2} O_2 \tag{8}$$

This highly reactive hydrocarbon radical can subsequently readily undergo oxidation. According to Born and Peters in "Reduction of Soot Emission in a DI Diesel Engine of Hydrogen Peroxide during Combustion," S.A.E. Technical Paper 982676 (1998), equation (7) represents the dominant reaction path for the decomposition of peroxide at temperatures above 727° C., not the thermolytic reaction generating water and oxygen, as shown in equation (8).

Maganas et al., U.S. Pat. No. 6,962,681, the disclosure of which is incorporated herein by reference, describes a system wherein catalytically reactive particles of silica or alumina interact with the moisture in combustion exhaust gases to generate hydroxyl radicals, which are returned to the site of combustion and increases the efficiency of combustion, resulting in reduced soot formation.

Hashimoto et al., U.S. Patent Application Ser. No. 2006/0185644, the disclosure of which is incorporated herein by reference, describes a fuel composition that includes 95-99.5 wt. % of a base fuel and 0.1-5 wt. % of an additive compound selected from the group consisting of an organic peroxide such as di-t-butyl peroxide, a nitrate ester such as n-pentyl nitrate, a nitrite ester such as n-pentyl nitrite, and an azo compound such as 2,2-azobis(2,4-dimethylvaleronitrile).

The inclusion of a free radical initiator in a fuel additive composition of the present invention provides multiple advantages:

When incorporated in a separate reverse-micellar composition or co-incorporated with a $CeO_2$ fuel borne additive in a reverse micelle, it provides a mechanism by which the internal engine components are "cleaned" or scrubbed of residual soot, thereby providing a fresh surface. This greatly accelerates the rate at which the cerium dioxide nanoparticles can be incorporated into the cast iron matrix of the engine, thereby reducing the time it takes to "condition" the engine, i.e., provide it with a coating of catalytic nanoparticles that results in an increase in mpg economy. Additionally, the preferred stabilizers for $CeO_2$ nanoparticles, for example, hydroxycarboxylic acids such as lactic and gluconic acids, are themselves potent free radical generators at high temperatures.

Even in a fully conditioned diesel engine in which the interior surfaces are rendered into a ceramic catalyst, the free radical mechanism would still account for most of the observed increase in fuel efficiency, owing to the fact that only 25% of the injected fuel actually comes in contact with the cylinder walls and thus becomes available for catalytic combustion; the majority of the fuel being combusted in the space over the piston head. Thus a fuel-borne additive that contains a water-soluble free radical initiator such as $H_2O_2$ within a reverse micelle would be very useful.

Additionally, a fuel-borne additive in which the reverse micelle contains only a free radical precursor could be used to great advantage with a nanoparticulate lubricity enhancing agent introduced as a component of the lubrication oil.

Generally, reverse micellar compositions having very small disperse particle diameters, preferably about 5 nm to about 50 nm, more preferably about 10 nm to about 30 nm, are very effective, as their disintegration and attendant release of superheated steam helps to mix the additive-containing diesel fuel with air in the combustion chamber, resulting in more complete fuel combustion.

Preferably, the free radical initiators included in the reverse micelle in accordance with the present invention have substantial water-solubility. The following patents, the disclosures of which are incorporated herein by reference, teach the use of water-soluble-free radical initiators:

U.S. Pat. No. 3,951,934 discloses azo-bis compounds, as well as combinations of water-soluble peroxides with tertiary amines, sulfites, and bromates.

U.S. Pat. No. 5,248,744 teaches azo-bis compounds as well as peroxydisulfates and organic peroxides.

U.S. Pat. No. 6,391,905 discloses the use of water soluble azo initiators, including four compounds commercially available from Wako Chemicals, Dallas Tex.

Oak Ridge National Laboratory document TM-11248 by W. V. Griffith and A. L. Compere includes an extensive list of cetane improvers for increasing engine power that may be included in the reverse-micellar compositions of the present invention. Useful compounds for this purpose include alkyl nitrates, esters, azoles, azides, ethers, and hydroperoxides such as cumene hydroperoxide.

Puchin et al., USSR patents 236,987 and 214,710 (1970), discloses that poly(dimethyl(vinylethnyl)methyl) t-butyl peroxide at a 0.01% level i.e. 100 ppm, gives a Δ octane % additive ratio of 1000, corresponding to a octane improvement of 10. The references also disclose "other additives" that may be small mono esters incorporated into aqueous micelles, or even long chain fatty acid mono esters (high cetane rating) that would nor require incorporation as a reverse micelle but might act as a surfactant, for a reverse micelle emulsion.

Hicks et al., U.S. Patent Appl. Publ. No. 2002/0095859, the disclosure of which is incorporated herein by reference, suites that high surfactant to water ratios on the order of 2.5:1 in a concentrated micro-emulsion forming fuel additive produces improved hydrocarbon fuel combustion at only 5 to 95 ppm of additional water.

A fuel additive composition of the present invention may comprise more earn rate type of reverse micelle. For example, one type of reverse micelle may include a octane improver, and a second type reverse micelle may include cerium-containing nanoparticles together with associated reverse micellar phase water that may be at least partially replaced by free radical initiator such as hydrogen peroxide or, more preferably, a stabilized hydrogen peroxide.

In accordance with the present invention, a cerium-containing fuel additive composition includes a surfactant/stabilizer mixture that preferably includes a combination of at least one non-ionic surfactant with at least one anionic surfactant, or a combination of a single-charged anionic surfactant and a multiple-charged anionic surfactant. The effect of the combination of surfactant/stabilizer compounds is to restrain the size of the nanoparticles, prevent their agglomeration, and enable an increase in the concentration of reactants, thereby producing a higher yield of nanoparticles.

The surfactant/stabilizer combination may have the added benefit of aiding in the solvent shift process from the aqueous polar medium to the non-polar oil medium. In a combination of charged and uncharged surfactants, the charged surfactant compound plays a dominant role in the aqueous environment. However, as solvent shifting occurs, the charged compound is likely to be solubilized into the aqueous phase and washed out, and the uncharged compound becomes more important in stabilizing the reverse micelle emulsion.

Dicarboxylic acids and their derivatives, so called "gemini carboxylates", where the carboxylic groups are separated by at most two methylene groups, are also useful cerium dioxide nanoparticle stabilizers. Additionally, $C_2$-$C_8$ alkyl, alkoxy and polyalkoxy substituted dicarboxylic acids are advantageous stabilizers.

In accordance with the invention, nanoparticle stabilizer compounds preferably comprise organic carboxylic acids such as, for example, 2-[2-(2-methoxyethoxy)ethoxy] acetic acid (MEEA) and ethylenediaminetetraacetic acid (EDTA), lactic acid, gluconic acid, tartaric acid, citric acid, and mixtures thereof.

A reverse-micellar composition in accordance with the present invention comprises an aqueous disperse phase that includes a free radical initiator, preferably water-soluble, and a continuous phase that includes a surfactant, an optional co-surfactant, and a hydrocarbon liquid, preferably selected from among toluene, octane, decane, D2 diesel fuel, ULSD, biodiesel, and mixtures thereof. In general, hydrocarbons containing about 6-20 carbon atoms are useful. The aqueous disperse phase of the composition comprises micelles having a mean diameter of preferably about 5 nm to about 50 nm, more preferably about 3 nm to about 10 nm.

Free radical initiators suitable for inclusion in the aqueous dispersed phase may be selected from the group consisting of: hydrogen peroxide, organic hydroperoxides, organic peroxides, organic peracids, organic peresters, organic nitrates, organic nitrites, azobis compounds, persulfate compounds, peroxydisulfate compounds and mixtures thereof. Preferred azobis compounds are selected from the group consisting of 2-2'-azobis (2-methylpropionamadine) dihydrochloride; 4-4'-azobis(4-cynovaleric) acid; 2-2'azobis [2-methyl-N-(2-hydroxyethyl)propionamide]; 2-2'-azobis[2-(2-imidazolin-2-2-yl) propane] dihydrochloride, and mixtures thereof.

In a preferred embodiment, the free radical initiator in the aqueous dispersed phase comprises stabilized hydrogen peroxide or t-butyl hydroperoxide. The aqueous disperse phase may further comprise. In addition to the aforementioned peroxides, a compound selected from the group consisting of a tertiary amine compound, a sulfite compound, a bromate compound, and mixtures thereof.

The reverse-micellar composition may further comprise boric acid or a borate salt in the aqueous disperse phase, and the hydrocarbon liquid preferably comprises diesel fuel. In a further embodiment of the invention, a lubricating oil that optionally contains cerium-containing nanoparticles may be used in conjunction with a fuel containing the reverse-micelle fuel additive.

The reverse micellar composition of the invention preferably includes as a radical initiator stabilized hydrogen peroxide or t-butyl hydroperoxide in the aqueous phase at a level of 30%, 40%, or even 50% or greater by weight, in another embodiment within the reverse, micellar composition the ratio of water to hydrocarbon by weight is greater than or equal to about 5%, about 10%, or preferably, greater than or equal to about 15% by weight. In a further embodiment, the reverse micellar composition includes an alcohol such as hexanol, and/or an alkoxylate surfactant such as Triton N-57.

A method for improving the performance of a diesel engine includes adding to diesel fuel for example, D2 diesel or biodiesel, a reverse micellar composition comprising an aqueous first disperse phase that includes a five radical initiator and a first continuous phase that includes a first hydrocarbon liquid and at least one first surfactant. Suitable free radical initiators such as hydrogen peroxide or t-butyl hydroperoxide, suitable hydrocarbon solvents preferably containing about 6 to about 20 carbon atoms, and suitable surfactants were described above. Preferred surfactants include only the elements C, H, and O, Preferably the aqueous disperse phase includes about 20 wt. %, or 30 wt. %, or more preferably 40 wt. % or more of the radical initiator.

Operating the engine and combusting the modified diesel fuel provides improved engine efficiency relative to unmodified diesel fuel Preferably, the modified diesel fuel includes less than 500 ppm water unless accompanied by an equal amount of free radical initiator.

A useful reverse micellar composition for use as a diesel fuel additive includes an aqueous disperse phase that includes a boric acid or a borate salt, and a continuous phase that includes a surfactant and a hydrocarbon liquid. Examples of useful borate salts include, for example, sodium borate and potassium borate. Examples of useful hydrocarbon liquids include toluene, octane, decane, D2 diesel fuel, biodiesel, and mixtures thereof. In general, hydrocarbons containing about 6-20 carbon atoms are useful. Suitable surfactants include Aerosol AOT; however, as already mentioned, preferred surfactants include only the elements C, H and O. Desirably, the aqueous disperse phase of the composition comprises micelles having a mean diameter of preferably, about 5 nm to about 50 nm, more preferably, about 10 nm to about 30 nm.

A method for improving diesel engine performance includes the addition of an additive as described above to diesel fuel to obtain modified diesel fuel. Such an additive, when used in combination with diesel fuel, may provide improved diesel fuel mileage, reduced diesel engine wear, or reduced pollution or a combination of these features.

Motor oil is used as a lubricant in various kinds of internal combustion engines in automobiles and other vehicles, boats, lawn mowers, trains, airplanes, etc. In engines there are contacting parts that move against each other at high speeds, often for prolonged periods of time. Such rubbing motion causes friction, forming a temporary weld, which absorbs otherwise useful power produced by the motor and converting the energy to useless heat. Friction also wears away the contacting surfaces of those parts, which may lead to increased fuel consumption and lower efficiency and degradation of the motor. In one aspect of the invention, a motor oil includes a lubricating oil, cerium dioxide nanoparticles, desirably having a mean diameter of less than about 10 nm more preferably 5 nm, and, optionally, a surface adsorbed stabilizing agent.

Diesel lubricating oil is essentially free of water, preferably less than 300 ppm, but may be desirably modified by the addition of a cerium dioxide-containing reverse-micellar composition in which the cerium dioxide has been solvent shifted from its aqueous environment to that of an organic or non-polar environment. The cerium dioxide compositions include nanoparticles having a mean diameter of less than about 10 nm more preferably about 6 nm, as already described. A diesel engine operated with modified diesel fuel and modified lubricating oil provides greater efficiency and may, in particular, provide improved fuel mileage, reduced engine wear or reduced pollution, or a combination of these features.

Metal polishing, also termed buffing, is the process of smoothing metals and alloys and polishing to a bright, smooth mirror-like finish. Metal polishing is often used to enhance cars, motorbikes, antiques, etc. Many medical instruments are also polished to prevent contamination in marks in the metals Polishing agents are also used to polish optical elements such as lenses and mirrors to a surface smoothness within a fraction of the wavelength of the light they are to manage. Smooth, sound, uniform cerium dioxide particles of the present invention may be advantageously employed as polishing agents, and may further be used for penalization (rendering the surface smooth at the atomic level) of semiconductor substrates for subsequent processing of integrated circuits.

Nanoparticles, or quantum dots, am being considered for many potential applications. Because of their small size, on the order of 1-20 nm, these nanoparticles have properties different, from their bulk versions, 100 nm and larger. They exhibit novel electronic, magnetic, optical, chemical, and mechanical properties that make them attractive for many technological applications. Those nanoparticles that fall into the semiconductor material category are being considered for biological labeling and diagnostics, light emitting diodes, solid-state lighting, photovoltaic devices, and lasers. Cerium dioxide nanoparticles are wide-gap semiconductors that are potentially useful in such applications, furthermore, suitably doped versions of cerium dioxide nanoparticles could extend the range of applications.

There are two critical properties of nanoparticulate ceria that make it uniquely suited for medical applications.

First and perhaps most critically, is ceria's very low to non existent toxicity to humans, a conclusion based upon human cell culture and other date, (*Evaluation of Human Health Risk from Cerium Added to Diesel Fuel*: Communication 9, 2001 Health Effects Institute, Boston Mass. and *Development of Reference Concentrations for Lanthanide, Toxicology Excellence for Risk Assessment*, The bureau of Land management, National Applied Resource Sciences Center, Amended Stage 2, November 1999).

The second property involves the utility of the $Ce^{3+}/Ce^{4+}$ redox couple. Reactive fee radical species such as the hydroxyl radical (OH) that can cause cellular damage in the body can be chemically reduced to the relatively harmless hydroxyl anion ($OH^-$) by $Ce^{3+}$. Conversely, another cellular damaging radical species, the oxygen radical anion ($O2^-$) can be oxidized to molecular oxygen by $Ce^{4+}$.

There have appeared a number of reports that describe the exploitation of these properties of nanoparticulate ceria, for example, to prevent retinal damage induced by intracellular peroxides (Chen, et al., *Nature Nanotechnology*, 1, p 142, November 2006) and tumor studies in which ceria confers radioprotection upon healthy but not cancerous cells (Tannuzzer, et. al., *NanoLetters* 5, 12, p 2573, 2005).

Suitably engineered nanoparticulate ceria, along with other nanomaterials, may be used as a biotag exploiting surface enhanced Raman spectroscopy for fields such as immunodiagnostics, molecular diagnostics and proteomics.

The invention is further illustrated by the following examples. These examples are not intended to limit the invention in any manner.

Example 1

Preparation of Cerium Dioxide Nanoparticles: Single Jet Addition

To a 3 liter round bottom stainless steel reactor vessel was added 1.267 liters of distilled water, followed by 100 ml of $Ce(NO_3)_3 \cdot 6\,H_2O$ solution (600 gm/liter $Ce(NO_3)_3 \cdot 6\,H_2O$). The solution was clear and has a pH of 4.2 at 20° C. Subsequently, 30.5 gm of 2-[2-(2-methoxyethoxy)ethoxy]acetic acid (MEEA) was added to the reactor vessel. The solution remained clear, and the pH was 2.8 at 20° C. A high sheer mixer was lowered into the reactor vessel and the mixer head was positioned slightly above the bottom of the reactor vessel. The mixer was a colloid mill manufactured by Silverson Machines, Inc., modified to enable reactants to be introduced directly into the mixer blades by way of a peristaltic tubing pump. The mixer was set to 5,000 rpm and 8.0 gm of 30% $H_2O_2$ was added to the reactor vessel. Then 16 ml of 28%-30% $NH_4OH$, diluted to 40 ml, was pumped into the reactor vessel by way of the mixer head in about 12 seconds. The initially clear solution turned an orange/brown in color. The reactor vessel was moved to a temperature controlled water jacket, and a mixer with an R-100 propeller was used to stir the solution at 450 rpm. The pH was 3.9 at 25° C. at 3 minutes alter pumping the $NH_4OH$ into the reactor. The temperature of the reactor vessel was raised to 70° C. over the next 25 minutes, at which time the pH was 3.9. The solution temperature was held at 70° C. for 20 minutes, during which time the solution color changed from orange brown to a clear dark yellow. The pH was 3.6 at 70° C. The temperature was lowered to 25° C. over the next 25 minutes, at which time, the pH was 4.2 at 25° C., Particle size analysis by dynamic light scattering indicated a cerium dioxide intensity weighted hydrodynamic diameter of 6 nm. The dispersion was then diafiltered to a conductivity of 3 mS/cm and concentrated, by a factor of about 10, to a nominal 1 Molar in $CeO_2$ particles.

Figure 4:
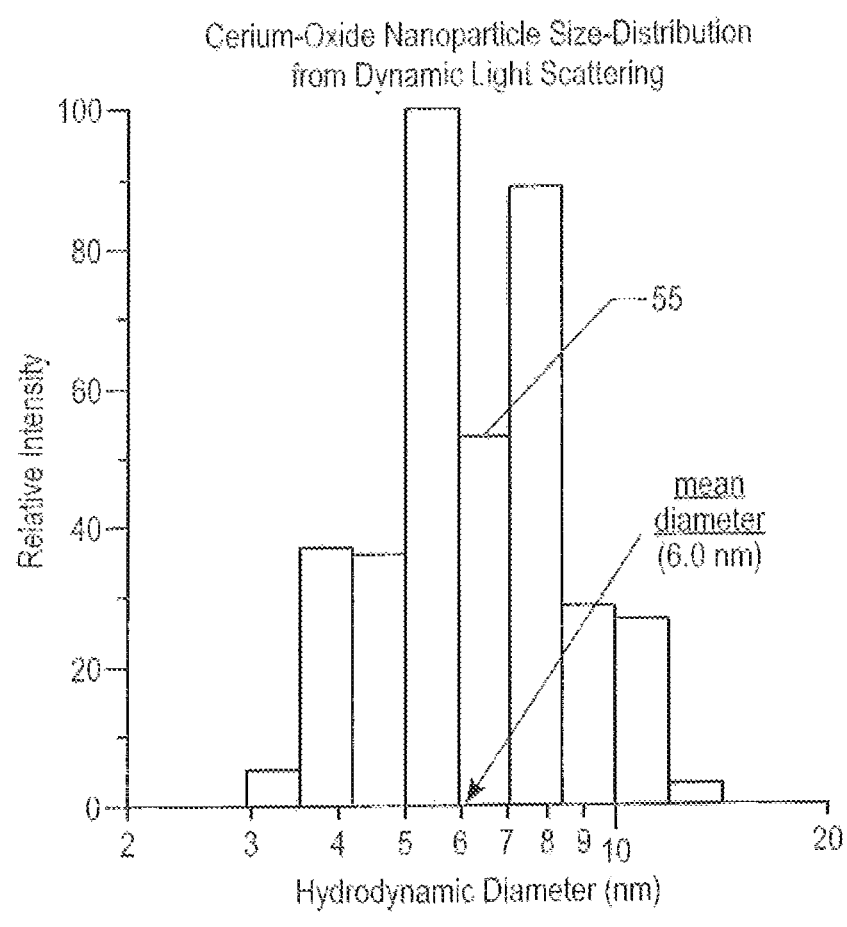
FIG. 4 shows the size distribution of the cerium dioxide particles prepared in Example 1.

The cerium dioxide particles were collected, the excess solvent evaporated off and the gravimetric yield, corrected for the weight of MEEA, was determined to be 26%. The size distribution of the cerium dioxide particles (plotted in FIG. 4), determined by dynamic light scattering, indicated a particle size having a mean intensify weighted hydrodynamic diameter of about 6 nm. Over two dozen replicated precipitations and independent measurements of these precipitations gave a mean intensity weighted size of 5.8 nm±−0.4 nm (one standard deviation). Thus, the reaction precipitation scheme is robust. Additionally, the size distribution is substantially monomodal, i.e., only one maximum, with most of the particles failing in the range 5.2 nm to 6.4 nm. Feature 55 of the shoe distribution is a binning artifact.

Figure 5:
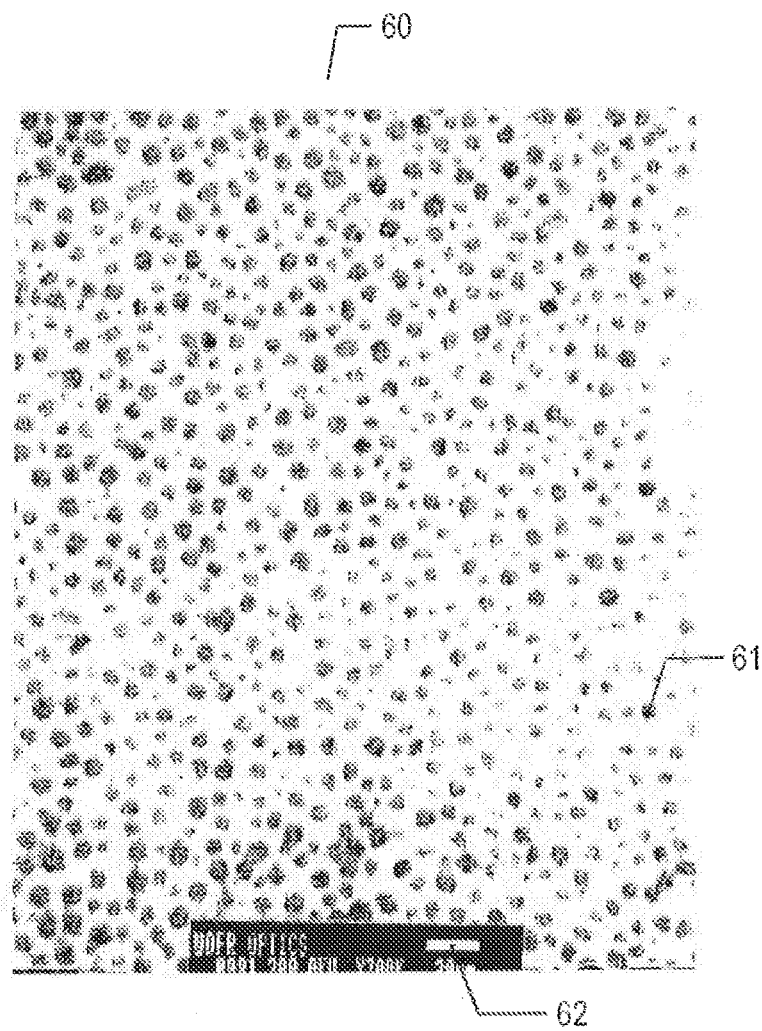
FIG. 5 shows a transmission electron micrograph of a dried-down sample of the cerium dioxide particles of Example 1.

A transmission electron microscope (TEM) was also used to analyze the cerium dioxide particles. A 9 microliter solution (0.26 M) was dried onto a grid and imaged to produce the image 60, shown in FIG. 5. The dark circular features 61 are the imaged particles. The particles show no signs of agglomeration, even in this dried-down state. In solution, the particles would be expected to show even less propensity to agglomerate. The gradicule (61) represents 20 nm; it is clear from FIG. 5 that the mean particle size is quite small, less than 10 nm. From several micrographs such as these, particles were individually sized and the mean was calculated to be 6.7±1.6 nm. This independently corroborates the sizing data measured by dynamic light scattering.

Figure 6:
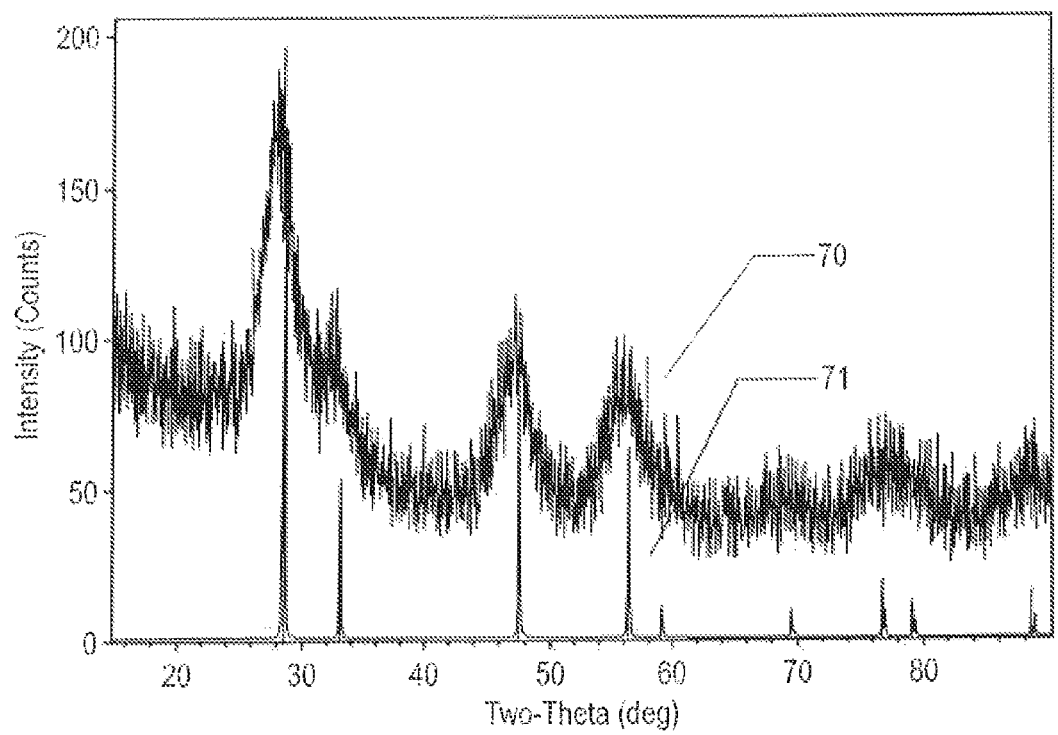
FIG. 6 shows an X-ray powder diffraction spectrum of cerium dioxide nanoparticles prepared in Example 1.

FIG. 6 shows an X-Ray powder diffraction pattern 70 of a sample of the dried cerium dioxide nanoparticles, together with a reference spectrum 71 of cerium dioxide, provided by the MIST (National Institute of Standards and Technology) library. The line positions in the sample spectrum match those of the standard spectrum. The two theta peak widths were very wide in the sample spectrum, which is consistent with a very small primary crystallite size and particle size. From the X-Ray data (Cu K alpha line at about 8047 ev) and the Scherrer formula (d=0.9*lambda/delta*cos(theta), where lambda is the x-ray wavelength, delta the full width half maximum, and theta the scattering angle corresponding to the x ray peak) the primary crystallite size is calculated to be 2.5±0.5 nm (95% confidence of 5 replicas).

Examples 1a-f

Evaluation of Alternative Stabilizers to MEEA

Example 1 was repeated, except that in Example 1a an equivalent molar amount of succinic acid was substituted for the MEEA stabilizer. A brown precipitate that readily settled was obtained, which is an indication of very large particles (several tens of microns). The same experiment was repeated each time substituting an alternative stabilizer (malonic acid—Example 1b, glycerol—Example 1c, ethyl acetoacetate—Example 1d). In each case, a readily settling brown precipitate was obtained, indicating the future to obtain nanoparticles. For Example 1e, lactic acid at twice the molar concentration was substituted for the MEEA stabilizer. Quasi-inelastic dynamic light scattering measurements revealed a mean hydrodynamic diameter panicle size of 5.4 nm when the hydroxide was doubled, and 5.7 nm when the hydroxide was increased by 75%. Mixtures of EDTA (which by itself produces no particles) and lactic acid at a ratio of about 20%/80% also gave particles of $CeO_2$ with a hydrodynamic diameter of 6 nm. In Example 1f, the optimal EDTA: lactic acid ratio of 1:4 was used, but at twice the overall concentration of this stabilizer mixture, which resulted in a decrease in the mean particle size to 3.3 nm. At a three times level (same ratio) there were no particles formed (the stabilizer effectively completed all the free cerium ion, preventing the formation of the hydroxide). It is therefore possible to control the particle size by adjusting the stabilizer component ratios and overall stabilizer concentration levels.

Example 2

$CeO_2$ Precipitation with EDTA/Lactic Acid Stabilizer—Effect of Mixing

To a 3 liter round bottom stainless steel reactor vessel was added 76.44 gm EDTA disodium salt in distilled wafer to a total weight of 1000 gm, 74.04 gm of DL-lactic Acid (85%), 240.0 gm of $Ce(NO_3)_3.6 H_2O$ in 220 gm of distilled water and 19.2 gm of 50% $H_2O_2$ aqueous solution. As in Example 1, the mixer speed was set to 5000 rpm, and the contents of the reactor were brought to a temperature of 22° C. Separately, a solution of 128.0 gm $NH_4OH$ (28-30%) was prepared. This quantity of hydroxide is equivalent to twice the number of motes of cerium solution, so the initially nucleated precipitate was presumably the bis-hydroxyl intermediate. In one experiment, the ammonium hydroxide solution was single jetted info the reactor in the reaction zone defined by the mixer blades and perforated screen. In another experiment, the hydroxide was added via a single jet just subsurface into the reactor in a position remote from the active mixing zone of the colloid mixer. After the usual heat treatment and filtration, the intensity weighted diameter of the $CeO_2$ particles produced at the actively mixed zone was 6.1 nm, with a polydispersity of 0.129. The diameter of the particles produced via the second method, i.e., sub-surface introduction of the of the ammonium hydroxide at a position remote from the reaction zone, was essentially the same, 6.2 nm, but the polydispersity was much greater, 0.149. Thus, the size frequency distribution can be narrowed by mixing in the high shear region of the colloid mill.

Example 3

$CeO_2$ Particle Size Dependence Upon Hydroxide Stoichiometry

The conditions of this experiment follow that of Example 2, except that the cerium ion was not in the reactor but was separately introduced via a jet into the reaction zone simultaneously with the jetting of the ammonium hydroxide solution. Three molar stoichiometric ratios of hydroxide ion to cerium ion were explored: 2:1, 3:1 and 5:1. The following table summarizes the intensity weighted particle size diameters and polydispersities obtained by the quasi-inelastic dynamic light scattering technique.

| OH:Ce mole ratio | $CeO_2$ diameter (nm) | $CeO_2$ Polydispersity | Gravimetric Yield (1000° C. muffle furnace) |
|---|---|---|---|
| 2:1 | 5.8 | 0.110 | 51.7% |
| 3:1 | 10.2 | 0.158 | 57.2% |
| 5:1 | 12.5 | 0.156 | 49.9% |

It is clear from the data that the smallest, most uniformly distributed particles can be obtained in good yield by this double jet procedure when the molar ratio of hydroxide to cerium is 2:1. The size of the particles obtained in higher yield under 3:1 stoichiometry conditions may be reduced by a suitable increase in the stabilizer level, as was demonstrated in Example 1f.

Example 4

$CeO_2$ Precipitation Temperature Effects

The effect of low temperature nucleation at 20° C. followed hydroxide conversion to the oxide at 70° C., versus an isothermal precipitation in which both nucleation and conversion were conducted at 70° C. was investigated using the reagent conditions specified in Example 2. The preferred double jet method was employed (separate jets for cerium ion and hydroxide ion, both introduced into the reactive mixing zone of the colloid mixer). The ammonium hydroxide concentration was at the 128 gm, i.e., 2× level or a OH:Ce molar stoichiometric ratio of 2:1. Quasi-inelastic dynamic light scattering measurements revealed that the particles made at the lower temperature precipitation had an intensity weighted hydrodynamic diameter of 5.8 nm, with a polydispersity of 0.117, and a yield of 54.6%, while the isothermal precipitation gave larger particles, 8.1 nm, that were more widely distributed, with a polydispersity of 0.143, in comparable yield. Thus, if a more uniform particle size frequency distribution is desired, it is preferable to nucleate at lower temperature before carrying out the higher temperature conversion of the hydroxide to the oxide.

Example 5

Preparation of Cerium Oxide-Containing Additive Formulations of Varying Batch Size Formulations with volumes of 207 ml, 1.5 liters, and 9.5 liters were prepared according to procedures summarized in the following table:

|  | Approximate Batch Volume | | |
|---|---|---|---|
|  | 207 ml | 1.5 liters | 9.5 liters |
| Reactor | 250-ml S.S. beaker w/ magnetic stirring bar | 3-liter S.S. round-bottomed vessel | 11-liter S.S. round-bottomed vessel |
| Solution Preparation Components |  |  |  |
| Distilled water in reactor | 127 g | 1.267 kg | 8.2355 liters |
| $Ce(NO_3)_3 \cdot 6H_2O$ | 8.52 g in distilled $H_2O$ to 25 ml | 60 g in $H_2O$ to 100 ml | 390 g in $H_2O$ to 500 ml |
| Stabilizer - MEEA | 4.36 g in distilled $H_2O$ to 25 ml | 30.5 g | 198.25 g |
| Oxidant - 50% $H_2O_2$ | 0.69 g in deionized $H_2O$ to 25 ml | 4.8 g | 31.2 g |
| Base - $NH_4OH$ (28-30% $NH_3$) | 2.29 g in distilled $H_2O$ to 3.4 g | 16 ml in distilled $H_2O$ to 40 ml | 104 ml in distilled $H_2O$ to 260 ml |
| Distilled water rinse | 2 ml | 20 ml | 100 ml |
| Precipitation Process |  |  |  |
| 1. Stabilize water at 15-25° C. 2. With mild stirring add solutions in the following order: $Ce(NO_3)_3$, MEEA, $H_2O_2$ 3. Insert a Silverson mixer with appropriate mixing head and jets | ¾ in tubular mixer head w/fine screen - 7,000 rpm | Standard mixer head w/fine screen - 5,000 rpm | Standard mixer head w/medium screen - 8,100 rpm |
| 4. Pump $NH_4OH$ solution at flow rate of | 17 ml/min | 200 ml/min | 650 ml/min |
| 5. Rinse water purge at folw rate of | 17 ml/min | 200 ml/min | 650 ml/min |
| 6., Heat the mixture to 70° C. by | Placing beaker in preheated 70° C. bath | Ramping temperature over 25 min | Ramping temperature over 25 min |
| 7. Hold at 70° C. for 50 min 8. Cool mixture to 20-25° C. 9. Filter via diafiltration to less than 3 mS/cm, and concentrate by 20X |  |  |  |

Particle sizes were determined for 19 of the large (9.5-liter) batches prepared as described above. The average particle hydrodynamic diameter was 5.8 nm, with a standard deviation of 0.40. Average particle sizes measured for 207-ml and 1.5-liter batches have generally fallen in the range of 5.2-6.4 nm, well within +/− two standard deviations of 5.8 nm (95% confidence level). Therefore it is reasonable to conclude that the particles from the two smaller batches are of essentially the same size as those of the large batches.

Example 6

Preparation of Fuel Concentrate

A portion of cerium dioxide dispersion, prepared as described in Example 1, was added slowly to a mixture of D2 diesel fuel, surfactant Aerosol AOT, and 1-hexanol co-surfactant, resulting in a clear reddish brown colored solution that can be employed as a fuel concentrate. The concentrate is 14% by volume cerium dioxide dispersion; the remaining volume is 1.72% 1-hexanol co-surfactant, 18.92% surfactant Aerosol AOT, and 65.36% diesel D2 diluents.

Example 7

Preparation of Additivized Diesel Fuel Containing Fuel Additive

A portion of the fuel concentrate, prepared in Example 6, was diluted 1 part to 600 parts of diesel fuel by volume. Thus the final additivized D2 fuel has nominally a concentration of 42 ppm (by weight) of $CeO_2$ and 258 ppm water and 361 ppm Aerosol AOT.

Example 8

Evaluation of Additivized Diesel Fuel

The additivized diesel fuel was evaluated in an Element Power Systems model #HDY5000LXB diesel generator operating at a Frequency of 60 Hz and a Power Factor of cos φ=1.0 rated at 5 KVA (AC power output). The diesel engine is a model #DH186FGED forced air cooled 4 stroke with a rated maximum power output of 10 HP. A portion of the exhaust is drawn through a porous filter medium by the action of a downstream in-line vacuum pump. Diesel particulate matter is collected on the filter media for 150 seconds, after which time its percent grey scale is measured (Adobe Photoshop). The percent grey scale is taken, as a measure of the amount of soot collected. The grey scale level increases as the amount of soot present on the filter media increases.

The diesel engine was operated for over an hour using normal D2 (low sulfur 500 ppm) fuel to equilibrate it. Towards the end of this time, diesel particulate matter was collected on a filter media for 150 seconds. The percent grey scale of the filter, which correlates with the amount of particulate material present, was measured at 70%, a figure typical for these operating conditions and collection times. The engine was turned off the fuel tank was drained of regular D2, and then partially filled and drained twice with additivized diesel fuel. The tank was then filled to the two-thirds level with additivized diesel fuel. The engine was then operated with the additivized D2 fuel for over an hour to equilibrate it to the new fuel. An increase of 3% in the energy output of the generator was measured (voltage multiplied by current through a 1.2 KW resistive load). The engine wax turned off, the additivized feel was drained from the fuel tank, and the tank was rinsed twice with normal diesel fuel and then filled to the two-thirds mark with normal diesel fuel. The engine was then operated for twenty minutes to purge the lines and filters of any residual additivized fuel. A power measurement indicated that the engine had returned to the normal operating conditions, that is, the 3% increase in power obtained when the engine was operated with additivized feel was no longer observed. Indicating that there is no residual additivized feel in the system. Diesel particulate was collected for 150 seconds, as described previously, and the percent grey scale was measured as 40%. This represents a 43% reduction in diesel particulate matter, as determined by the change in the grey scale of the test filter, even though the fuel no longer contains additive.

This example illustrates that the internal working parts of the engine have been conditioned by the nanoparticulate $CeO_2$ in a time scale of approximately one hour. Conditioning involves incorporating $CeO_2$ info the walls and pistons of the engine. The $CeO_2$ is assisting in carbon combustion by providing oxygen according to the following reaction:

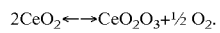

$2CeO_2 \leftrightarrow Ce_2O_3 + \frac{1}{2} O_2$.

Improved combustion results in a reduction of particulate matter as reflected in the diminished grey scale of the test filter.

Example 9

Preparation of a Cerium Dioxide-Containing Fuel Additive by Reverse-Micelle Formation D2 diesel fuel (2320 ml) and co-surfactant, 1-pentanol (200 ml) were placed in a 6 liter Erlenmeyer flask. The surfactant, AOT (800 g), which was broken into small particles before addition, was then added in 40 gm portions to the flask with magnetic stirring. Following addition of the AOT, the resulting clear solution was allowed to stand for 1 hour. During this time, the solution changed from a light amber color to an orange color as the microemulsion formed.

A 500-mL dispensing burette containing 525 mL of the aqueous $CeO_2$ solution (nominal 1.0 M $CeO_2$ stabilized with 1.5 M MEEA) was mounted over the flask. The first 400 mL of this solution was added as a slow steady stream with stirring. As the aqueous $CeO_2$ was added, a slime-like cloud surrounded the vortex. The addition was stopped every 100 mL to allow the solution to clear. Initially, the solution required about 1 minute to clear between 100-mL additions, but after 200 mL had been added, the solution cleared more rapidly, A slower addition rate for the last 125 mL was used; addition was stopped every 50 mL to allow the solution to clear. Audition of aqueous $CeO_2$ over a 90 minute period results in a deep orange-brown solution, that was allowed to equilibrate for 12 hours, during which time the color had changed from orange-brown to greenish-brown.

The procedure described above was used to prepare 1.00 gallons (3.785 L) of a microemulsion containing about a 19700 ppm $CeO_2$ in D2 diesel fuel, with a water to surfactant (AOT) mole ratio of 16.2 and an aqueous volume fraction of 14%. A 1:600 addition of this microemulsion to D2 diesel fuel (density 0.85 g/mL) gives a fuel having 32.8 ppm cerium dioxide (based on 70% yield of a 10x concentrate of $CeO_2$ prepared from an initial 0.0945 $Ce(NO_3)_3$ solution) having 30 ppm sulfur and 265 ppm water.

Example 10

Test Data: Griffith Energy On-Road Tests

A "cetane improved" formulation that included reverse micelles containing 220 ppm hydrogen peroxide and 220 ppm water suspended in ultra low sulfur diesel was run at Griffith Energy from Oct. 18 to Nov. 17, 2006, using both a control and test 12-liter diesel, class 8 tractors. Once each week, mpg (miles per gallon) data were downloaded from each of the Volvo truck on board computers ("Trip Manager") and fit to a linear regression model that explained 80% of the mpg variation. The data are presented in the table below. The greatest improvements on day 21 and day 35 are underestimates of the true potential of the formulation as non-treated days were averaged into the weekly results, due either to beginning the treatment mid-week (day 20) or encountering filter plugging (day 28) Chemical analysis of the plugged fuel filters revealed primarily soot particles, from which it can be concluded that the formulation cleans all of the engine parts, including the fuel circulation system. No data were collected on day 49, but it is believed that the treated truck was becoming "dirty" (normal operation), and that day 49 or subsequent data would have shown that this truck returned to the baseline of 4.74 mpg. Based upon tire mpg baseline offset of 1.72%, the cetane improved formulation demonstrated a maximal effect of 9.44% improvement in mpg (day 35).

| Control (mpg) | Experiment (mpg) | Percent Change | Day |
|---|---|---|---|
| 4.42 | 4.74 | 1.72 | start |
| 4.75 | 4.74 | 1.72 | 7 |
| 4.66 | 4.84 | 3.86 | 14 |
| 4.57 | 5.06 | 8.37 | 21 |
| 4.76 | 4.76 | 2.15 | 28 |
| 4.83 | 5.18 | 11.16 | 35 |
| 4.66 | 5.00 | 7.30 | 42 |

Example 11

Static Engine Test Data

Test Data: Environmental Energy Technologies (EET) Static Engine Test-EET diesel generator specifications are as follows:

| Generator: | Element Power Systems | model # HDY5000LXB |
|---|---|---|
| | Frequency | 60 Hz |
| | Power Factor | $\cos \phi = 1.0$ |
| | Rated AC Output | 5 KVA |
| Engine: | | model # DH186FGED |
| | Type | forced air cooled 4 stroke |
| | Max Output | 10 HP |
| | Fuel | diesel light fuel (BS-AI) |
| | Fuel Consumption Rate | 210-286 g/kW |
| | Oil Temperature | <95° C. |
| | Exhaust Temperature | <480° C. |

The diesel generator tank was chained and flushed of old fuel two times before refueling with new D2 diesel fuel. The engine was brought to a steady state at the beginning of each day's test by running at 30% load for a warm-up period of approximately 10 to 20 minutes, which allowed drainage of old fuel from the engine fuel. Following warm-up, testing was performed for the given load by drawing exhaust at a fixed flow rate through filter papers for a duration of 150 seconds per sample. An estimate of diesel particulate matter (soot) and the effect of the fuel formulation was made by measuring the optical reflectance of the filter paper that had entrained the soot. Between fuel changes, the engine was given approximately 5 minutes to reach steady state operating conditions. For tests requiring the fuel additive, the engine was turned off drained and flushed twice with premixed fuel containing the fuel additive emulsion.

The data in the table that follows indicate that, at 1500 ppm water, the diesel generator power drops from 1080 w to 320 w, a decrease of 70% for a drop of 5° C. This is accompanied by a 16% reduction in diesel particulate matter, clearly a very poor power for pollution trade-off.

Subsequent testing revealed that as much as 300 ppm of water had very little if any effect on power while reducing diesel particulate matter by 13%, Finally, ax much as 28% of the diesel particulate matter can be reduced by a very substantial concentration of water, 960 ppm with only a small 5% power loss when the formulation contained 540 ppm of hydrogen peroxide. Thus by balancing the water effect of lowering combustion temperature/efficiency and soot production by the presence of a free radical initiator such as hydrogen peroxide it is possible to simultaneously maintain high engine performance and achieve a lowering of the DPM thereby avoiding a power for pollution trade-off.

To 435 mL ultra low-sulfur diesel fuel in a 1.5 liter vessel is added 113 mL 1-hexanol, with good volumetric stirring, until a homogeneous mixture is formed. Then, 325 mL of the non-ionic surfactant Triton N57 is added, with good mixing. After one hour, which enables the three-component mixture to stabilize, 127 mL of 50 wt % aqueous hydrogen peroxide is slowly added over a 15 minute period. The aqueous hydrogen peroxide had been previously stabilized against catalytic decomposition by free metals with stannate and metal chelating agents, e.g., phosphonates and/or etidronic acid.

A period of twelve hours is allowed for the final emulsion to reach thermodynamic equilibrium. Samples of this microemulsion, diluted both 1:250 and 1:500 parts with ULSD, are stable down to 5° C., with no apparent chemical degradation, and stable for 2.5 hours at 100° C. without apparent oxidation (as determined by UV/visible spectroscopy).

Example 14

Reverse-Micellar Free Radical Initiator Composition Containing t-Butyl Hydroperoxide and 70% Neutralized Oleic Acid The following formulation makes 1.0 L of a 30 v % t-HYDRO solution (tertiary butyl hydroperoxide) stabilized in a oleic acid/ethanolamine/1-hexanol/diesel microemulsion.

|  | Date | Load (waits) | Exhaust T ° C. | Total PM Reduction Comparison to Control | water/H2O2 ppm | decane ppm | AOT ppm |
|---|---|---|---|---|---|---|---|
| Test 1 D2 Control | Jul. 06, 2006 | 1030 w | 103 C. | 0% | 0/0 | 0 | 0 |
| Test 2 Emulsified D2 |  | 320 w | 98 C. | 16% | 1500/0 | 6100 | 3400 |
| Test 1 D2 Control | Jul. 18, 2006 | 1217 w | 106 C. | 0% | 0/0 | 0 | 0 |
| Test 2 |  | 1224 w | 116 C. | 13% | 300/0 | 1620 | 680 |
| Test 4 |  | 1160 w | 114 C. | 28% | 980/540 | 6100 | 340 |

Example 12

Formulation of a Stable Non-Sulfur Containing Free Radical Reverse-Micelle Composition 130 ml of a 1-hexanol solution is added with low shear mixing to 440 ml of Ultra Low Sulfur Diesel. Then 310 ml of Triton N-57 is added to the diesel alcohol mixture. A gestation time of 1 hour is allowed. Finally, 120 ml of a 50% hydrogen peroxide/water solution is added to the above mixture at a constant flow rate over a 15 minute period allowing for good uniform volumetric mixing during this time period. After a 12 hour equilibration period the micro emulsion has reached a state characterized by particles that are measured to be in the range of 5 nm to 9 nm (by light scattering). This concentrate diluted one part per 500 would give a final concentration of 120 ppm $H_2O_2$ and 120 ppm water.

Example 13

Preparation of Reverse-Micelle Free Radical Initiator Using Stabilized Hydrogen Peroxide The following formulation makes 1.0 L of a 12.7 v % of a 50 w % aqueous hydrogen peroxide solution stabilized in a Triton N57/1-hexanol/diesel microemulsion. This formulation, when diluted 1/500 in ultra low-sulfur diesel, will contain 150 ppm (mg/L) $H_2O_2$ active ingredient and 150 ppm (mg/L water).

This formulation, when diluted 1/500 in ultra low-sulfur diesel will contain 390.6 ppm (mg/L) active ingredient (t-butyl-hydroperoxide).

To 418.0 mL of intra low-sulfur diesel fuel in a 1.5 liter vessel is added 35.0 mL 1-hexanol, with good volumetric stirring, until a homogeneous mixture is formed. Then 220.0 mL of technical grade oleic acid is added, with good mixing, followed by 27 mL of ethanolamine. After one hour, which enables the four component mixture to stabilize, 300.0 mL of t-HYDRO (70 v % t-butyl hydroperoxide in water) is slowly added over a 25 minute period, preferably at a temperature above 25° C.

A period of twelve hours is allowed for the final emulsion to reach thermodynamic equilibrium. Samples of this microemulsion diluted 1:250 parts with ULSD are stable down to 5° C., with no apparent chemical degradation, and stable for 2.5 hours at 125° C. without apparent oxidation (as determined by UV/visible spectroscopy).

Example 15

Improved Lubricity Using Fuel Including Cerium Dioxide Particles

Lubricity was determined by measuring wear on a ball bearing rubbed on a plate coated with fuel containing the respective fuel additives. Wear was determined by the depth, in mm, of the average scar imparted by rubbing. Neat fuel, without an additive, gave a 0.35 mm scar. Test results for fuel with a commercial additive, Platinum Plus™, a comparative fuel additive including 10 nm particles; and the inventive fuel additive including 5 nm particles were 0.32, 0.31, and 0.245 mm respectively. Low wear numbers correlate with greater lubricity. Thus, the inventive small particles afford a 30% improvement in lubricity.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed:

1. A process of making nanoparticles, comprising:
   (a) forming an aqueous reaction mixture comprising cerous ion, hydroxide ion, an α-hydroxy carboxylic acid, and an oxidant; and
   (b) heating the reaction mixture to a temperature in the range of about 20° C. to about 100° C., thereby forming a product dispersion of cerium dioxide nanoparticles.

2. The process according to claim 1, wherein said α-hydroxy carboxylic acid is selected from the group consisting of lactic acid, gluconic acid, tartaric acid, citric acid and 2-hydroxybutanoic acid.

3. The process according to claim 2, wherein said α-hydroxy carboxylic acid is lactic acid.

4. The process according to claim 1, wherein said reaction mixture further comprises a polyacid.

5. The process according to claim 4, wherein said polyacid is ethylenediaminetetraacetic acid.

6. The process according to claim 5, wherein said α-hydroxy carboxylic acid is lactic acid and said polyacid is ethylenediaminetetraacetic acid.

7. The process according to claim 1, wherein said oxidant is hydrogen peroxide.

8. The process according to claim 4, wherein said α-hydroxy carboxylic acid is citric acid.

9. The process according to claim 8, wherein said polyacid is ethylenediaminetetraacetic acid.

* * * * *